United States Patent
Bunio et al.

(10) Patent No.: US 10,450,511 B2
(45) Date of Patent: Oct. 22, 2019

(54) PRODUCTION OF HYDROCARBON PRODUCT AND SELECTIVE REJECTION OF LOW QUALITY HYDROCARBONS FROM BITUMEN MATERIAL

(71) Applicant: SUNCOR ENERGY INC., Calgary (CA)

(72) Inventors: Gary Bunio, Calgary (CA); Iftikhar Huq, Calgary (CA)

(73) Assignee: SUNCOR ENERGY INC., Calgary, Alberta (CA)

( * ) Notice: Subject to any disclaimer, the term of this patent is extended or adjusted under 35 U.S.C. 154(b) by 253 days.

(21) Appl. No.: 15/440,794

(22) Filed: Feb. 23, 2017

(65) Prior Publication Data
US 2017/0275535 A1 Sep. 28, 2017

Related U.S. Application Data

(60) Provisional application No. 62/296,803, filed on Feb. 23, 2016.

(51) Int. Cl.
| | |
|---|---|
| *C10G 1/00* | (2006.01) |
| *C10C 3/06* | (2006.01) |
| *C10G 1/04* | (2006.01) |
| *C10G 67/04* | (2006.01) |
| *C10G 21/00* | (2006.01) |

(52) U.S. Cl.
CPC ............ *C10G 1/006* (2013.01); *C10C 3/06* (2013.01); *C10G 1/002* (2013.01); *C10G 1/04* (2013.01); *C10G 21/003* (2013.01); *C10G 67/049* (2013.01); *Y02P 30/10* (2015.11)

(58) Field of Classification Search
CPC ....... C10G 1/006; C10G 21/003; C10G 1/002; C10G 1/04; C10G 67/049; C10C 3/06; Y02P 30/10
See application file for complete search history.

(56) References Cited

U.S. PATENT DOCUMENTS

| | | |
|---|---|---|
| 4,631,677 A | 12/1986 | Park et al. |
| 6,980,940 B1 * | 12/2005 | Gurpinar ............... E21B 43/00 703/10 |
| 7,813,935 B2 | 10/2010 | Chitty et al. |
| 8,005,658 B2 | 8/2011 | Tilke et al. |
| 9,189,576 B2 | 11/2015 | Kim et al. |
| 9,228,415 B2 | 1/2016 | Ingham et al. |
| 9,262,713 B2 | 2/2016 | Shelley et al. |
| 2008/0078543 A1 | 4/2008 | Carlson |
| 2014/0006111 A1 | 1/2014 | Priyesh et al. |

(Continued)

FOREIGN PATENT DOCUMENTS

| | | |
|---|---|---|
| CA | 2602280 A1 | 8/2001 |
| GB | 2439488 A | 12/2007 |

*Primary Examiner* — Randy Boyer
*Assistant Examiner* — Juan C Valencia
(74) *Attorney, Agent, or Firm* — BakerHostetler

(57) ABSTRACT

Methods are described for the production of a hydrocarbon product and selective rejection of low quality hydrocarbons from a bitumen-containing material, where product quality, production yield, processing input requirements, and environmental benefits are assessed for selecting a candidate method for deployment. The methods facilitate selection and deployment of sustainable hydrocarbon production operations rather than focusing on maximizing volumetric yield of hydrocarbons.

20 Claims, 9 Drawing Sheets

(56) References Cited

U.S. PATENT DOCUMENTS

| | | |
|---|---|---|
| 2014/0129296 A1 | 8/2014 | Muraviyova et al. |
| 2014/0311750 A1 | 10/2014 | Heneman et al. |
| 2015/0241337 A1 | 8/2015 | Talabi et al. |
| 2015/0247941 A1 | 9/2015 | Fiduk et al. |

* cited by examiner

PRODUCTION OF HYDROCARBON PRODUCT AND SELECTIVE REJECTION OF LOW QUALITY HYDROCARBONS FROM BITUMEN MATERIAL

TECHNICAL FIELD

The technical field relates to the production and processing of hydrocarbons, and more particularly to the production of hydrocarbon products and selective rejection of low quality hydrocarbons from bitumen-containing materials.

BACKGROUND

There is an ongoing desire to further improve the efficiency and performance of hydrocarbon recovery and processing methods. It is also widely recognized that many methods for recovery and processing of hydrocarbons are associated with high input requirements, such as energy input. This is particularly applicable in the recovery and processing of heavy oil and bitumen, as the heavy oil and bitumen must be mobilized in order to extract or separate the hydrocarbons from the mineral matrix that often includes sand and clay. The processing of heavy oil and bitumen can also require significant energy input to separate or process various components of such complex hydrocarbon materials. The capital and operating costs for recovery and processing of heavy oil and bitumen can be significant. To recover the significant costs associated with recovery and processing of heavy oil and bitumen, conventional operations have focused on maximizing the volumetric yield of hydrocarbons extracted from the starting material and of hydrocarbon products produced from intermediary processed hydrocarbons throughout the overall processing operation.

SUMMARY

In a paradigm shift regarding the recovery and processing of hydrocarbons from heavy oil and bitumen, a hydrocarbon production method can be deployed based on selective rejection of low quality hydrocarbons and selective production of a hydrocarbon product, in addition to a consideration of product quality, production yield, input requirements and environmental benefits of the method. Assessing multiple candidate methods based on such a combination of factors can facilitate selection and deployment of efficient methods, production of high quality hydrocarbon products, selective rejection of undesirable components, and increased environmental advantages of operations for processing heavy oil and bitumen.

Thus, the deployment of a given hydrocarbon production method is based on a relatively counterintuitive assessment, where volumetric yield is not automatically prioritized as the dominant factor, but rather selective and purposeful rejection of hydrocarbons and environmental benefits are important factors that inform which methods to implement.

A process for producing a hydrocarbon product and selectively rejecting low quality hydrocarbons from a bitumen-containing material, can include:
   characterizing hydrocarbons present in the bitumen-containing material to identify higher quality hydrocarbon fractions and lower quality hydrocarbon fractions, wherein the higher quality hydrocarbons have at least one property selected from a higher hydrogen-to-carbon ratio, a lower metals content, a lower asphaltene content, a lower boiling point, a lower molecular weight, a lower olefin content, a lower viscosity, a lower density, a higher processability, a higher refinability, a higher similarity compared to a benchmark crude oil, a lower contaminants content, or a lower sulfur content, compared to lower quality hydrocarbons;
   selecting a candidate method from multiple candidate methods for producing a corresponding hydrocarbon product from the bitumen-containing material, wherein the selecting of the candidate method is based on:
      i) product quality of the hydrocarbon product producible by the corresponding candidate method;
      ii) production yield of the hydrocarbon product producible by the corresponding candidate method;
      iii) processing input requirements to generate the hydrocarbon product using the corresponding candidate method, comprising at least one of energy requirements, equipment requirements, materials requirements, maintenance requirements, greenhouse gas emission cost or waste remediation requirements; and
      iv) environmental benefits of using the candidate method, comprising at least one of reduced greenhouse gas emissions, reduced waste production, reduced water use, reduced land disturbance, reduced wildlife impact, or reduced vegetation impact, as compared to a baseline method for recovery of hydrocarbons from the bitumen-containing material;
      wherein each candidate method:
         selectively rejects a particular quantity of low quality hydrocarbons from the bitumen-containing material, the rejected low quality hydrocarbons comprising at least a portion of the lower quality hydrocarbon fraction identified in the bitumen-containing material, or a processed lower quality hydrocarbon fraction formed by processing hydrocarbons identified in the bitumen-containing material in accordance with the candidate method, or a combination thereof;
         selectively produces the corresponding hydrocarbon product free of the rejected hydrocarbons and including at least a portion of the higher quality hydrocarbon fraction identified in the bitumen-containing material, or a processed higher quality hydrocarbon fraction formed by processing hydrocarbons identified in the bitumen-containing material in accordance with the candidate method, or a combination thereof; and
      wherein the selected candidate recovery method has an environmental benefit that is neutral or positive when compared to the baseline method; and
      deploying the selected candidate method to produce the hydrocarbon product and selectively reject the particular quantity of low quality hydrocarbons from the bitumen-containing material.

The bitumen-containing material can be from a subterranean bitumen-bearing reservoir and the candidate methods comprise in situ recovery methods. Alternatively, the bitumen-containing material is from a minable oil sands deposit and the candidate methods comprise oil sands mining or extraction methods. Another option is that the bitumen-containing material is a bitumen-containing process stream derived from a subterranean bitumen-bearing reservoir, a minable oil sands deposit, or a combination thereof. In such cases, the bitumen-containing process stream can include or be an oil sands ore stream, an aqueous oil sands slurry stream, a non-aqueous oil sands slurry, a bitumen froth stream, a diluted bitumen stream, or a non-upgraded bitumen stream, or a combination thereof.

The selective rejection of the low quality hydrocarbons from the bitumen-containing material can include diverting the rejected low quality hydrocarbons to storage or disposal. In addition, the rejected low quality hydrocarbons can form part of a rejected stream that further includes at least one of water, mineral solids, and metals.

The environmental benefits of each candidate method can include at least reduced greenhouse gas emission intensity compared to the baseline method.

In some cases, selecting includes, for each candidate method: determining a product quality indicator, a production yield indicator, a processing input requirements indicator and an environmental benefits indicator for the candidate method; and combining the determined product quality indicator, production yield indicator, and processing input requirements indicator to generate a feasibility indicator. The candidate method is then selected based on both the feasibility indicator and the environmental benefits indicator.

The selection can include, for each candidate method, aggregating the product quality indicator, the production yield indicator, the processing input requirements indicator and the environmental benefits indicator to generate a single sustainability indicator; and selecting the candidate method having the highest sustainability indicator. In some implementations, the selective rejection of the particular quantity of the low quality hydrocarbons is a predominant factor that causes the selected candidate method to have a higher feasibility indicator compared to the non-selected candidate methods, a higher environmental benefits indicator compared to the non-selected candidate methods, or a combination thereof.

In addition, the selected candidate method selectively rejects the highest quantity of low quality hydrocarbons of the multiple candidate methods.

In one example implementation, the bitumen-containing material is a non-upgraded bitumen stream, and the candidate recovery methods comprise at least a solvent deasphalting method wherein the corresponding rejected low quality hydrocarbon fraction comprises an asphaltene-rich fraction and the corresponding hydrocarbon product comprises a substantially deasphalted product; and a coking method wherein the corresponding rejected low quality hydrocarbon fraction comprises a coke-rich fraction and the corresponding hydrocarbon product comprises an upgraded product. In this case, the solvent deasphalting method has favourable production yield, processing input requirements and environmental benefits compared to the coking method, that offset lower quality of the substantially deasphalted product compared to the upgraded product. Thus, the selected candidate method is the solvent deasphalting method.

In another example implementation, the bitumen-containing material is a non-upgraded bitumen stream, and the candidate recovery methods comprise at least a solvent deasphalting method wherein the corresponding rejected low quality hydrocarbon fraction comprises an asphaltene-rich fraction and the corresponding hydrocarbon product comprises a substantially deasphalted product; and a hydrocracking method wherein the corresponding rejected low quality hydrocarbon fraction comprises a hydrocracking residue fraction and the corresponding hydrocarbon product comprises a hydrotreated product. In this case, the solvent deasphalting method has favourable processing input requirements and environmental benefits compared to the hydrocracking method, that offset lower quality and production yield of the substantially deasphalted product compared to the hydrotreated product. The selected candidate method is thus the solvent deasphalting method.

In another general case, the candidate methods include at least a first candidate method and a second candidate method, the first candidate method having at least favourable processing input requirements and environmental benefits compared to the second candidate method and which offset lower production yield of the hydrocarbon product of the first candidate method compared to the hydrocarbon product of the second candidate method. In this case, the selected candidate method is the first candidate method.

In certain implementations, each candidate method abstains from immediate active processing of the rejected low quality hydrocarbons after separation thereof from remaining hydrocarbons.

It is also noted that, in the selecting step, the product quality can based on at least one property selected from hydrogen-to-carbon ratio, metals content, asphaltene content, boiling point, molecular weight, olefin content, viscosity, density, processability, refinability, similarity compared to a benchmark crude oil, contaminants content, or sulfur content. Other properties can also be used to determine product quality.

The candidate methods can also be for performing hydrocarbon recovery, hydrocarbon processing, or a combination thereof.

In addition, one or more of the candidate methods can produce multiple hydrocarbon products, and the selecting can then be performed based on the product quality of the multiple hydrocarbon products, the production yield of the multiple hydrocarbon products, the processing input requirements to produce the multiple hydrocarbon products, and the environmental benefits related to production of the multiple hydrocarbon products. Furthermore, one or more of the candidate methods can produce a non-hydrocarbon product, and the selecting is then also performed based on quality of the non-hydrocarbon product, yield of the non-hydrocarbon product, input requirements to produce the non-hydrocarbon product, and environmental benefits related thereto.

It is also noted that various aspects, implementation, embodiments and examples disclosed herein can be combined together in various ways to provide methods for hydrocarbon production and selection of recovery and processing operations.

BRIEF DESCRIPTION OF THE DRAWINGS

Various aspects and implementations will now be described by way of example only with reference to the appended drawings wherein.

DETAILED DESCRIPTION

Figure 1:
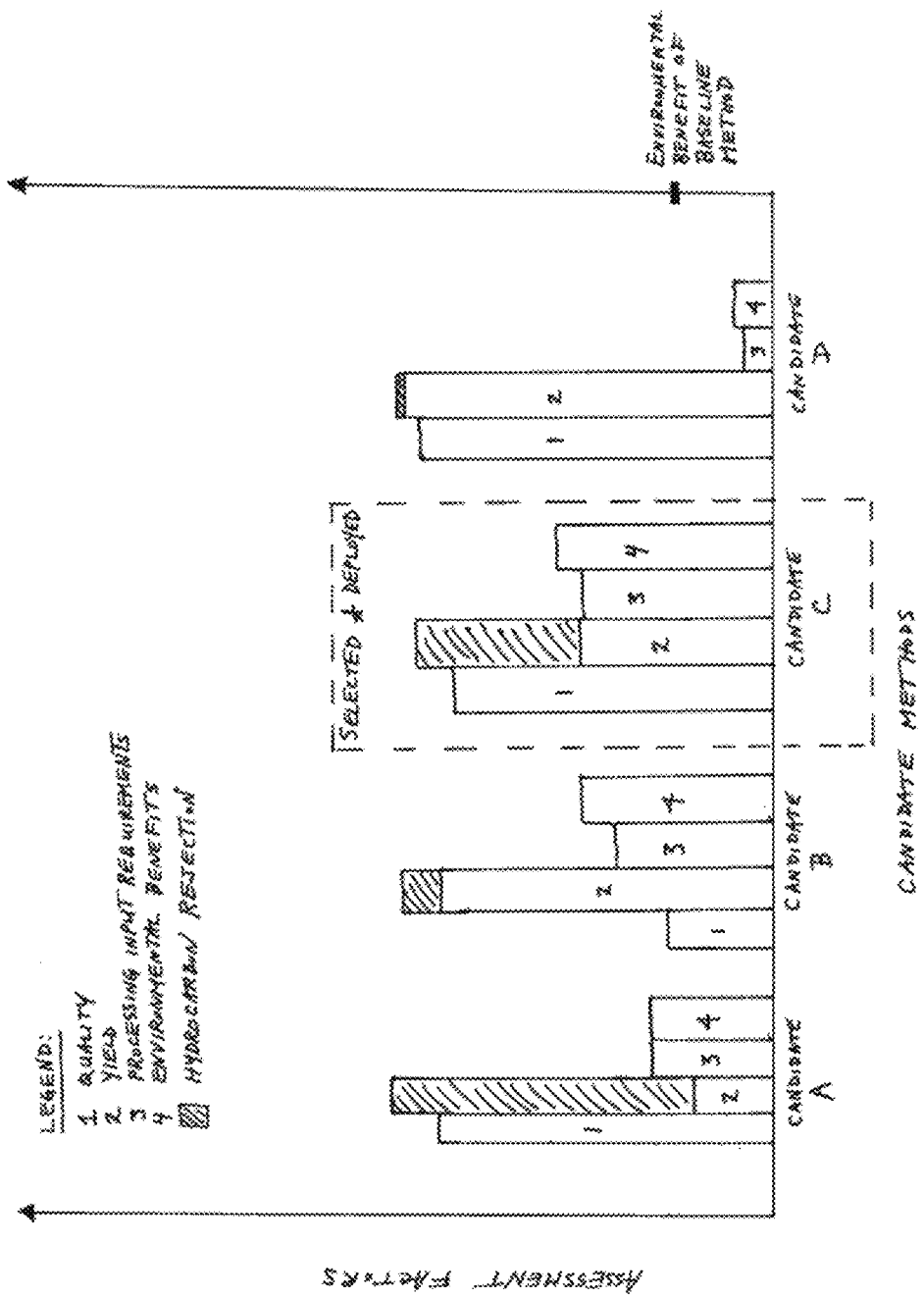
FIG. 1 is a graph of assessment factors for various candidate methods.

Various techniques are described herein for the production of hydrocarbons from bitumen-containing material. In general, considering rejection of low quality hydrocarbons as a relevant factor while taking into account the product quality, production yield, processing input requirements, and environmental benefits of several candidate methods for processing a characterized bitumen-containing material, can facilitate selection and deployment of methods that have reduced intensity in terms of requirements for implementation and environmental impact, while enabling production of high quality hydrocarbon products.

In one implementation, a process for producing a hydrocarbon product and selectively rejecting low quality hydrocarbons from a bitumen-containing material includes the general steps of characterizing hydrocarbons present in the bitumen-containing material, selecting a candidate method from multiple candidate methods for producing a corresponding hydrocarbon product from the bitumen-containing material, and deploying the selected candidate method. The hydrocarbon product produced by the deployed method can have a predetermined composition of high quality hydrocarbons and excludes a selectively rejected low quality hydrocarbon fraction. The selection of the candidate method to deploy is based on product quality, production yield of the product, selectivity of the candidate method to produce and reject certain hydrocarbons, processing input requirements, and environmental benefits.

Characterizing of hydrocarbons present in the bitumen-containing material is performed to identify higher quality hydrocarbon fractions and lower quality hydrocarbon fractions. This characterization can be based on one or more properties. For example, the characterization can be performed such that higher quality hydrocarbons have at least one property selected from the following: a higher hydrogen-to-carbon ratio, a lower metals content, a lower asphaltene content, a lower boiling point, a lower molecular weight, a lower olefin content, a lower viscosity, a lower density, and a lower sulfur content, compared to lower quality hydrocarbons. Various other properties can be measured and taken into consideration. For instance, high quality hydrocarbons can be those that have a high market value or can be processed into hydrocarbons having a high market value. Market value of hydrocarbons can depend on various factors, such as refinability using certain refining methods, and the ability for the hydrocarbons to be further processed into other end-products, such as consumer products.

In some cases, characterizing high and low quality hydrocarbons and can be based on a benchmark set of properties. For instance, when the high quality hydrocarbons to recover from the bitumen-containing material are desired to resemble a particular type of crude oil, the properties that are considered can be those that would be considered when assessing that particular type of crude oil (e.g., West Texas Intermediate crude oil, Brent Blend crude oil, OPEC Basket crude oil). One or more ASTM and API (American Petroleum Institute) methods for analyzing a wide range of hydrocarbon properties can also be used to evaluate quality. Standard analytical methodologies to characterize bitumen properties can be employed for characterizing the high and low quality hydrocarbons. Thus, the characterization step can identify hydrocarbons or hydrocarbon mixtures having certain properties to facilitate method selection; the method selected will be one that selectively recovers high quality hydrocarbons and rejects low quality hydrocarbons for the purpose of producing a hydrocarbon product with the certain desired properties, the result being the production of a high value hydrocarbon product.

Selection of a method from multiple candidate methods is based on certain factors. In particular, selection is based on the following:

i) product quality of the hydrocarbon product producible by the corresponding candidate method;

ii) production yield of the hydrocarbon product producible by the corresponding candidate method;

iii) processing input requirements to generate the hydrocarbon product using the corresponding candidate method (including, for example, energy requirements, equipment requirements, materials requirements, maintenance requirements, greenhouse gas emission cost and/or waste remediation requirements); and iv) environmental benefits of using the candidate method, including, for example, reduced greenhouse gas emissions, reduced waste production, reduced water use, reduced land disturbance, reduced wildlife impact, and/or reduced vegetation impact, as compared to a baseline method for recovery of hydrocarbons from the bitumen-containing material.

Other factors, such as the selectivity of the candidate method to produce the corresponding hydrocarbon product and to reject the corresponding low quality hydrocarbons, can also be considered.

The selection of the method for deployment is thus based on several factors, which facilitates a holistic and sustainable approach to the development of hydrocarbon production operations. By factoring in (i) product quality and (ii) production yield, the evaluation takes into consideration the hydrocarbon output potential of each candidate method, which is linked to the value-generation potential of the candidate methods. In other words, the quality and yield of the hydrocarbon product that can be produced with a certain candidate method are related to the economic value of that method. In turn, (iii) processing input requirements account for the input cost for the candidate methods. In order to enable processing by a given candidate method, there are certain input requirements that are related to capital and operating costs of that method.

Together, factors (i) to (iii) can generally represent overall economic potential of the candidate methods, as such factors account for the value generated from producing the hydrocarbon product and the associated cost. For instance, candidate methods with high product quality, high production yield and low input requirements will generally have high overall value potential, whereas methods with low product quality, low yield and high input requirements will generally have low value potential. As will be explained in further detail below, for each candidate method, factors (i) to (iii) can be determined in terms of respective indicators (i.e., a product quality indicator, a production yield indicator, and a processing input requirements indicator), and these indicators can be combined together to generate an overall feasibility indicator.

It is noteworthy that selective hydrocarbon rejection can have a positive impact on one or more factors (i), (ii) and (iii). For example, selective rejection of a low quality hydrocarbon fraction can result in an increase in product quality and the method can use rejection techniques that have low processing input requirements, with the result being that the higher product quality and lower input requirements can more than offset a reduction in production yield that may occur due to the hydrocarbon rejection. In terms of "production yield", this is a reference to the yield of production of the particular hydrocarbon product that is producible using the particular candidate method as derived from a bitumen (or heavy oil) containing input stream. For example, if the input stream is oil sands ore, and the product is a raw, unprocessed bitumen product derived from oil sands ore using the candidate method, then the production yield can be expressed as the amount of raw bitumen product produced (e.g., expressed in barrels) per unit (e.g., tonnes) of oil sands ore processed using the particular candidate method. Production yield can be expressed using various units.

The selectivity factor can be viewed as the candidate method's ability to produce a specific composition of hydrocarbons and to reject hydrocarbons having specific properties. For example, a candidate method that has the ability of rejecting substantially all of a specific fraction of low quality hydrocarbons would be considered as having high rejection selectivity. One example of a method with high selectivity is coking, since the rejected hydrocarbons are substantially composed of coke and the high quality hydrocarbons are substantially free of coke. An example of a method with high rejection selectivity is solvent deasphalting, which can be implemented to remove relatively specific types of hydrocarbons (e.g., asphaltenes) while not removing other types of hydrocarbons. Relatively specific quantities of asphaltenes can be removed by controlling the solvent type, solvent-to-bitumen ratio, the temperature, and pressure of the deasphalting process. An example of a method with lower selectivity is conventional distillation, in which some high quality hydrocarbons tend to report to the underflow along with the heavy lower quality hydrocarbons.

Product selectivity can be viewed as the amount of desired high quality hydrocarbons in the hydrocarbon product divided by the amount of undesired low quality hydrocarbons in the hydrocarbon product, with an ideal theoretical selectivity being infinity. Likewise, rejection selectivity can be viewed as the amount of low quality hydrocarbons in the rejected fraction divided by the amount of high quality hydrocarbons in the rejected fraction, again with an ideal theoretical selectivity being infinity. The selectivity of a given candidate method can be determined and can be used when determining one or more of the other factors (i) to (iv). For example, a candidate method with low product selectivity may result in a lower product quality, since low quality hydrocarbons are expected to be present in the hydrocarbon product, while having higher production yield due to more (albeit lower quality) hydrocarbons reporting to the product stream. A candidate method with high product selectivity may result in a higher product quality at the expense of higher processing input requirements due to more intense processing to achieve the high selectivity. Candidate methods with higher selectivity can be advantageous, particularly when the product selectivity and/or rejection selectivity do not require significant increase in processing input requirements.

The environmental benefits factor can be considered independently from processing input requirements that may be involved in mitigating environmental impacts, such as requirements for handling, treating or reclaiming waste streams that result from the candidate methods. For example, considering greenhouse gas (GHG) emissions, a candidate method may have a GHG emissions level which has a corresponding input requirement in the form of a carbon tax on GHG emissions resulting from use of the method. The processing input requirements therefore include this carbon tax requirement and the associated cost. However, when compared to a baseline method for recovery of hydrocarbons from a bitumen-containing material, if the GHG emission intensity (e.g., expressed as $CO_2$ emitted per barrel of oil produced) is lower than the GHG emission intensity of the baseline method, there is an overall environmental benefit to deploying the candidate method. That is, on a per barrel of oil (i.e., hydrocarbon product) produced basis, the overall $CO_2$ emission intensity is less—meaning less GHG emissions per barrel of oil. Because the GHG emission intensity is lower, any carbon tax accruing on the basis of the GHG emissions will also be reduced, meaning the "processing input requirements" will reflect a lower carbon tax requirement than the baseline method. However, that is a separate consideration from the actual benefit to the environment of having less GHG emitted into the atmosphere. In this sense, the impact of GHG emissions has dual-impact in the evaluation of the candidate methods, i.e., first, in the context of carbon tax requirement, and second in terms of the GHG emission reduction benefit compared to the baseline method. Considering GHG emissions reduction in terms of its environmental benefits separately from the economic cost related to GHG emissions can provide a more robust assessment of candidate methods that is not overly swayed by market and regulatory-based factors that may be more susceptible to changes over time.

In another example, the environmental benefit may include waste production, for example, tailings production by the candidate methods. In this case, the requirements for tailings storage, treatment, displacement, and reclamation can be incorporated into the determination of the processing input requirements. Additionally, the tailings production can be considered separately as an environmental benefit in terms of a reduced tailings production rate, and/or reduced total production volume over a period of time, as compared to a baseline method. The environmental benefit is the actual reduction in the amount of tailings produced, whereas the processing input requirement is the cost of managing, treating and providing reclamation for the tailings that actually end up produced. These are two separate and distinct impacts—albeit both related to tailings.

Regarding the evaluation and consideration of environmental benefits, it should be noted that selection of the candidate method can be based on a single environmental benefit (e.g., GHG emission intensity) or a combination of several environmental benefits. When multiple environmental benefits are considered, the environmental benefits can be assessed and used in the selection of the candidate method in various ways. For example, each environmental benefit can be weighted and then combined together to generate a single environmental benefit indicator. Alternatively, the environmental benefits can be considered individually when comparing to the baseline method.

The selection of the method from multiple candidate methods can be based on the above-described factors (i) to (iv), as well as the criterion that the selected candidate method has an environmental benefit that is neutral or positive when compared to the baseline method. If only one environmental benefit (e.g., GHG emission intensity) is considered, then it is compared to the corresponding environmental impact of the baseline method to ensure that it is neutral or positive. If multiple environmental benefits are considered, a single environmental benefit indicator can be determined and compared to a corresponding indicator of the baseline method to ensure the aggregated indicator is neutral or positive. Alternatively, if multiple environmental benefits are considered, the environmental benefits can be considered individually to ensure that each and every one is neutral or positive compared to those of the baseline method, that a majority of the environmental benefits is neutral or positive compared to the baseline method, or that at least one or more predetermined environmental benefits is neutral or positive compared to those of the baseline method. Candidate methods for which all of the environmental benefits fall below those of the baseline method should be discarded from the selection process for failure to meet the environmental benefit criterion.

In some cases, the evaluation of the candidate methods can include aggregating the product quality indicator, the production yield indicator, the processing input requirements indicator and the environmental benefits indicator to generate a single "sustainability indicator", and selecting the candidate method having the highest sustainability indicator, in addition to its having an environmental benefit that is neutral or positive compared to the baseline method. The sustainability indicator can be a composite of the feasibility indicator and an environmental benefits indicator. More regarding determination of sustainability indicators is discussed further below.

As mentioned above, each candidate method selectively rejects low quality hydrocarbons and selectively produces high quality hydrocarbons. More particularly, each candidate method selectively rejects a particular quantity of low quality hydrocarbons from the bitumen-containing material, the rejected low quality hydrocarbons comprising a low quality hydrocarbon fraction identified in the bitumen-containing material, or a processed low quality hydrocarbon fraction formed by processing hydrocarbons identified in the bitumen-containing material in accordance with the candidate method, or a combination thereof. In other words, the selectively rejected hydrocarbons may be present in the original bitumen-containing material and/or may be formed during the processing of the original material. For example, when the bitumen-containing material is raw bitumen obtained from an in situ hydrocarbon recovery operation, it may contain asphaltenes that are identified in the characterizing step and then are rejected to produce a substantially deasphalted product and a rejected asphaltene-containing stream. In this case, the rejected hydrocarbon components were present in the bitumen-containing material.

Alternatively, some candidate methods include processing steps that modify the structure of the hydrocarbon components that are present in the original material, forming new hydrocarbon molecules and fractions. For example, thermal treatment of the same raw bitumen may result in cracking reactions such that some of the original asphaltenes present in the raw bitumen are transformed into smaller asphaltene molecules and lighter, higher quality hydrocarbons. In this case, the asphaltene fraction in the thermally treated bitumen would not include the same asphaltene molecules that were present and characterized in the raw bitumen. Thus, if that thermally treated asphaltene fraction is identified for rejection, then it would be a processed asphaltene fraction that is formed by processing hydrocarbons identified in the original bitumen-containing material in accordance with the candidate method. In other words, an example of a processed low quality hydrocarbon fraction that can be selectively rejected is an asphaltene fraction that results from thermal treatment of a bitumen-containing material. This selectively rejected asphaltene fraction would not be identical to the asphaltene fraction originally present in the bitumen-containing material prior to thermal treatment.

It should also be noted that the rejected hydrocarbons can be a combination of original and processed low quality hydrocarbons, which can occur for example when the candidate method includes a separation step as well as a reaction step. For instance, a candidate method could include a first step that includes partial deasphalting to remove some asphaltenes originally present in the bitumen-containing material, followed by a second step that includes thermal treatment of the asphaltene-depleted stream to form new hydrocarbon fractions including some asphaltenes. The resulting thermally treated stream could optionally be subjected to additional separation to remove and reject the additionally formed asphaltenes (or, indeed, other types of low quality hydrocarbons) that would be considered as rejected processed low quality hydrocarbons.

Each candidate method also selectively produces a corresponding hydrocarbon product substantially free of the rejected hydrocarbons and including a high quality hydrocarbon fraction identified in the bitumen-containing material, or a processed high quality hydrocarbon fraction formed by processing hydrocarbons identified in the original bitumen-containing material in accordance with the candidate method, or a combination thereof. For instance, some candidate methods include processing steps that modify the structure of the hydrocarbon components that are present in the original material, forming new high quality hydrocarbon molecules. For example, thermal treatment of raw bitumen may result in cracking reactions such that some of the original large, low quality asphaltenes crack to form high quality hydrocarbons. In this case, the high quality hydrocarbons formed from the cracking reactions can be part of the "processed high quality hydrocarbon fraction". The processed high quality hydrocarbon fraction is selectively produced (i.e., as the hydrocarbon product) and the corresponding processed low quality hydrocarbon fraction is selectively rejected.

As mentioned above, the selection of the method from multiple candidate methods can be based on the above-described factors, as well as the criterion that the selected candidate method has an environmental benefit that is neutral or positive when compared to the baseline method. For example, a baseline method may have a certain GHG emission intensity and thus the selected method would either have a substantially equal or lower GHG emission intensity compared to the baseline method. This selection factor can be performed upfront as a pre-selection step or at the end of a selection procedure. For example, several candidate methods can be subjected to a preliminary assessment in terms of their respective GHG emission intensity, which is compared to those of a baseline method. All candidate methods exceeding the baseline GHG emission intensity are discarded in the pre-selection step. Subsequently, the retained candidate methods can be assessed based on factors (i) to (iv) described above to determine the selected method for deployment.

Alternatively, all of the candidate methods can be evaluated based on factors (i) to (iv), and then the selected method with the best overall profile is selected with the additional verification that it has equal or lower GHG emissions than the baseline method.

In another example, a pre-selection can be made based on one environmental benefit (e.g., GHG emission intensity), the remaining candidate methods are then assessed based on factors (i) to (iv) to identify top potential candidate methods, and then the candidate methods are finally assessed based on other environmental benefits (e.g., reduced waste production, water use, etc.) such that the selected method has the highest number of environmental benefits that outperform the baseline method.

The selected method is then deployed to produce the hydrocarbon product and selectively reject the low quality hydrocarbons from the bitumen-containing material. Deployment can occur in stages that include technology development, processing and engineering design, construction, startup, and ramp up to full operating capacity, as well as wind down operations. It should be noted that the deployed version of the selected method does not have to be identical in every way to the version of the selected candidate method that was previously assessed. It is common for a method to be adjusted or refined during detailed design and engineering as well as during operation. For example, the selected candidate method may have been assessed based on certain operating parameter assumptions, but such operating parameters including temperatures, pressures, concentrations of input streams, output streams, chemical additive streams, and the like, can be adjusted in the course of design and implementation of the selected method. In addition, the deployment of the selected method does not have to result in an identical hydrocarbon product, production yield, processing input requirements, and environmental benefits as determined for the selection of that method. However, the characteristics of the deployed method should be generally in line with the characteristics that were assessed lead to the selection of that candidate method for deployment.

Various methodologies are described herein for selecting the way in which a bitumen-containing material is processed in a more sustainable manner. In some cases, selection can be based at least in part on environmental and economic value considerations. Some methods facilitate simultaneously reducing the economic and environmental intensity associated with the recovery and processing of hydrocarbons to derive products for sale. The methods are well suited to the recovery and production of heavy oils, such as the recovery of bitumen from oil sands. Oil sands sources can be evaluated to characterize a high value hydrocarbon fraction that can be preferentially recovered and processed, and a low value hydrocarbon fraction that can be selectively rejected. Preferential recovery and processing of the higher value hydrocarbon fraction in combination with selective rejection of the low value hydrocarbon fraction can improve both economic and environmental performance of hydrocarbon recovery and processing. Notably, this selective recovery and processing of hydrocarbon fractions is not based on simply maximizing volumetric yield of recovered hydrocarbons or of processed products, but on maximizing the sustainability of recovery and processing.

Furthermore, oil sands sources can be evaluated to identify recoverable and/or processable hydrocarbons, and various recovery and/or processing methods can be evaluated independently or in combination to determine relevant selection factors each recovery/processing method or combination. In some cases, as briefly mentioned above, a sustainability indicator can be determined for each recovery/processing method or combination. The sustainability indicator can be determined by aggregating factors (i) to (iv) discussed above, which can involve economic and environmental evaluations with the environmental evaluation considered together with the economic evaluation of each candidate method or combination to determine the sustainability indicator for the candidate method. Selection of the candidate recovery and/or processing method with the highest sustainability indicator results in the preferential recovery and processing of high value hydrocarbon fractions and the selective rejection of low value hydrocarbon fractions. In addition, hydrocarbon fractions for which a highest sustainable value recovery and processing combination do not meet a minimum sustainable value threshold can be rejected, as such fractions would otherwise increase the economic cost and environmental impact of recovery and processing hydrocarbons from the oil sands source.

In contrast to the typical goal of reservoir production and hydrocarbon processing to maximize volumetric yield, the methodologies described herein result in the intentional, selective rejection of low value hydrocarbon fractions that achieves reductions in the net cost per unit (e.g., barrel) of produced hydrocarbon, and/or reduces the environmental impact per unit (e.g., barrel) of produced hydrocarbon (for purposes of this description, a barrel may be referred to as the unit, although other unit measures can apply). The rejection of lower value hydrocarbon fractions and selective processing of higher value hydrocarbon fractions can drive a more efficient downstream process design, leading to improved processing efficiency, reduced capital costs, reduced operating costs, and/or reduced environmental impacts. In some cases, cost efficiencies and environmental impact reductions can be achieved concurrently by focusing the recovery and processing of hydrocarbons on simultaneously maximizing economic value and maximizing environmental value, rather than simply maximizing the volumetric yield of hydrocarbon-derived products from the bitumen-containing material.

By contrast, conventional hydrocarbon recovery and processing methods are typically based solely on economic evaluation, which is determined based on actual costs of recovery and/or processing, and on the market value of the products derivable from each fraction that is recovered and/or processed. On that basis, hydrocarbon recovery and processing has typically been evaluated through the lens of maximizing volumetric recovery and maximizing product yield. Conventionally, methods involving a deliberate and selective rejection of hydrocarbons are not considered in such economic evaluations, as deliberate hydrocarbon rejection typically has not been viewed as acceptable from an economic or regulatory perspective.

The selective rejection of hydrocarbons can be accomplished by intentionally failing to recover the rejected fraction from the bitumen-containing material. In other implementations, the rejected fraction can be recovered, but not processed to derive products. For example, low value hydrocarbon fractions can be recovered from a reservoir using an in situ recovery method, but can then be rejected in whole or in part to obtain the hydrocarbon product that excludes the rejected fraction. Fractions for which the most suitable recovery and processing method combination does meet an acceptable sustainability threshold can be recovered and processed accordingly. The highest value fractions and methods can be identified and prioritized for recovery and processing.

It is known that governments or regulatory agencies may require an environmental review prior to approval of hydrocarbon recovery methods being undertaken in a region. The environmental review in such circumstances generally involves a consideration of environmental risks, and selecting (on a cost basis) appropriate options for mitigating those risks.

Various techniques are described for considering an environmental evaluation together with an economic evaluation to arrive at a sustainability or "sustainable value" determination for the purpose of selecting a hydrocarbon recovery and/or processing method and/or combination of methods. The determined sustainable value (based on economic and environmental evaluations) is used to select a hydrocarbon recovery and/or processing method that results in the preferential recovery and/or processing of higher value hydrocarbon fractions while deliberately and selectively rejecting lower value hydrocarbon fractions.

While some processing methods with lower costs and higher environmental value are potentially available or under development, these are generally associated with a lower product yield/quality and deemed unacceptable or unallowable based on regulations governing minimum hydrocarbon recovery from reservoirs or other sources, and further regulations or policies regarding the minimum hydrocarbon product volumes or revenue that must be derived from the recovered hydrocarbons. When recovery and processing methods are focused on maximizing volumetric product yield, higher costs and higher environmental impacts can result. By contrast, lower cost and higher environmental benefit methods for recovery and processing of hydrocarbons that result in lower recovery volumes and lower product volumes (due to rejection of hydrocarbons), can result in equal or higher economic value with higher environmental benefits. It is thus relatively counterintuitive to favour purposeful reduction of hydrocarbon yield by selectively rejecting hydrocarbons, but methods with selective rejection can in fact enable high quality hydrocarbon products, lower processing input requirements, and higher environmental benefits, which more than offset the loss in production yield when viewed together, i.e., taking a holistic approach. Consequently, selective hydrocarbon rejection can be leveraged in order to select and deploy more sustainable methods for hydrocarbon production.

When an overall sustainability indicator is determined taking into account both economic and environmental evaluations, the sustainability indicator can tend to favour lower cost and lower environmental impact methods, which may be lower yield methods, with minimal or negligible reduction in economic value.

Throughout this specification, numerous terms and expressions are used in accordance with their ordinary meanings. Provided below are definitions of some additional terms and expressions that are used in the description that follows.

"Bitumen" and "heavy oil" are normally distinguished from other hydrocarbons based on their relative densities and/or viscosities, which often depend on context. Commonly-accepted definitions classify "heavy oil" as petroleum (the density of which is between 920 and 1000 kg/m$^3$), and "bitumen" as oil produced from bituminous sand formations (the density of which is greater than 1000 kg/m$^3$). For purposes of this specification, the terms "bitumen" and "heavy oil" are used interchangeably such that each one includes the other. For example, where the term "bitumen" is used alone, it includes within its scope "heavy oil".

As used herein, "oil sands" refers generally to a subsurface formation that is primarily composed of a matrix of unconsolidated sand and clay, with hydrocarbons occurring in the porous matrix. The term further refers to mined ore containing recoverable or extractable hydrocarbons.

"Crude oil" refers to a mixture of hydrocarbons. Crude oils from various sources or that result from different processing methods can have different compositions. Synthetic crude oil, for example, can refer to a mixture of hydrocarbons resulting from the upgrading of heavy oil or bitumen. The properties of synthetic crude oil, and of other crude oils, will vary based on the oil source and types of processing methods used to upgrade or refine the oil.

"Recovery" refers to the separation of hydrocarbons from sand or other reservoir material. Regarding in situ operations, recovery occurs as hydrocarbons are removed from the reservoir via production wells. Regarding surface mining operations, recovery typically occurs in an extraction plant, where oil is recovered from the sand and other reservoir material, for example by hot water extraction or solvent assisted extraction to recover bitumen froth.

"Processing" refers to an extraction, froth treatment, upgrading, refining, or other treatment step involving a hydrocarbon stream. Generally, subsequent processing steps will result in a treated stream that becomes more similar in composition to the one or more products to be derived from the stream. For example, a treated hydrocarbon stream can have a higher hydrogen content due to catalytic hydrogen addition, can be composed of smaller and less complex hydrocarbon molecules, and/or can contain a lower concentration of solids or asphaltenes than the untreated hydrocarbon stream. Examples of processing steps can include, without limitation, physical separation (e.g., liquid/solid), heating, cooling, distillation, hydrotreatment, hydrocracking, fractionation, visbreaking, thermal cracking, upgrading, or coking. Processing can also refer to methods involving the transport of hydrocarbon streams from one location to another, where the hydrocarbon stream must meet a particular specification for transport. The transport specification can be met by treatment or modification of the hydrocarbon stream prior to transport, and can further involve treatment or modification of the hydrocarbon stream after transport. For example, diluent addition to a hydrocarbon stream and diluent recovery from a hydrocarbon stream can be considered processing steps for the hydrocarbon stream.

"Fraction" refers to a collection of hydrocarbons that are similar in composition, or physical characteristics (e.g., viscosity), boiling point, location, geologic origin, or in recoverability or processability, among other properties.

"Hydrocarbon product" refers to the desired hydrocarbon output of a corresponding candidate method and will depend on the nature of the method itself. For example, when the given method is defined as receiving oil sands ore and subjecting the ore to recovery and processing steps to produce a pipelinable bitumen stream for sale, storage or transport, the final pipelinable bitumen stream is considered the hydrocarbon product, and the candidate method will likely comprise a series of processes collectively referred to as the "method". When the given method is defined as receiving oil sands slurry and subjecting the slurry to recovery steps to produce bitumen froth that can be further processed by downstream methods, then the bitumen froth is considered as the hydrocarbon product in this example. Thus, depending on how the method under evaluation is defined, particularly in terms of the high value output streams of the method, the hydrocarbon products can include various different streams with different compositions and hydrocarbon properties.

"Product quality" in terms of applicability to the hydrocarbon product refers to the quality of that product, which may be based on a number of properties, including hydrogen-to-carbon ratio, metals content, asphaltene content, boiling points, molecular weight, olefin content, viscosity, density, sulfur content, and so on. As mentioned above, the product quality can be assessed using various standard techniques. When comparing different candidate methods, the product quality of each candidate method should be assessed based on substantially similar, if not identical, criteria. It should also be noted that certain properties, such as boiling point, may not have a linear relationship with product quality, since the highest quality hydrocarbon fraction may have boiling points that are at a mid-range between very low boiling points and very high boiling points. The product quality can also be represented as a product quality indicator, which can be a score (e.g., out of 10, which may be based on a benchmark score), a value based on monetary units, or a value based on other units such as energy (i.e., based on the accessible energy content of the product) or productivity (i.e., based on what can be produced with the product). The product quality indicator can be on a per volume or per mass basis. By way of example, product quality for a hydrocarbon product that is meant for sale to the market (e.g., bitumen crude) can be based on the product's similarities to other types of crude oil that are considered easier to transport, store and/or refine compared to conventional bitumen crude.

"Production yield" refers to the yield of the hydrocarbon product based on the hydrocarbons in the bitumen-containing material. For example, if the hydrocarbon product is synthetic crude and the input stream to the candidate method under consideration is oil sands ore, then the production yield can be expressed as the barrels of synthetic crude produced per tonne of oil sands ore processed. Other expressions of production yield and units therefore are also possible. A high yield indicates that a large portion of the hydrocarbons present in the bitumen-containing material are present (in their original or processed form) in the hydrocarbon product. A very low yield indicates that a significant portion of the hydrocarbons have been rejected. The production yield can be represented as a production yield indicator. The production yield indicator can be combined with the product quality indicator to generate a production value indicator, which can be generally indicative of the value generated by the method as relates to the hydrocarbon product.

"Processing input requirements" refer to the requirements to implement a given method and can include requirements related to energy, equipment, materials, maintenance, greenhouse gas emissions and waste remediation. The processing input requirements can be represented as a processing input requirements indicator, which can be a score, a value based on monetary units representing the cost of the method, or a value based on other units. In this expression, the term "processing" should not be understood as necessitating extraction, froth treatment, upgrading, refining, or the like, as described above, as the "processing input requirements" can also apply to the evaluation of candidate methods that only have "recovery" steps but still have input requirements for the implementation of the candidate method. Higher processing input requirements indicate higher costs for method deployment.

"Environmental benefits" of a given method generally refers to reduced environmental impacts compared to a baseline method, although it can also refer to actual environmental advantages. For example, environmental benefits of a given method can include reduced greenhouse gas emissions, reduced waste production, reduced water use, reduced land disturbance, reduced wildlife impact, and reduced vegetation impact, as compared to a baseline method. Environmental benefits could also include an environmental advantage that would not otherwise arise except for the implementation of that method, such as a waste stream generated by the method being used in the remediation of a polluted material that was itself not generated by the method. The environmental benefits can be represented as an environmental benefits indicator, which can be a score, a value based on monetary units, or a value based on other units. The environmental benefits indicator can be converted to have the same units as the other indicators, and can be weighted appropriately for comparison purposes and/or for aggregation with the other indicators to generate a sustainability indicator.

Referring to FIG. 1, the assessment factors can be determined for multiple candidate methods (e.g., methods A to D) and compared based on those determined factors as well as a minimum environmental benefits threshold based on a baseline method. It should be noted that the height of the bars on this graph indicate favourability of each factor. Thus, a high bar for quality indicates high product quality, a high bar for yield indicates high yield, a high bar for input requirements indicates that low input requirements are necessary, and a high bar for environmental benefits indicates high benefits and thus lower environmental impact. The production yield factor (2) is illustrated in conjunction with the hydrocarbon rejectivity of the method, where the shaded bar shown above the yield factor bar (2) schematically represents the relative amount of hydrocarbons rejected by deployment of the candidate method.

In the illustrative example of FIG. 1, candidate method A enables high product quality (1), however, the excessively high hydrocarbon rejection, very low yield (2) coupled with relatively unfavourable input requirements (3) and environmental benefits (4) make candidate method A a relatively poor choice.

Candidate method B results in low quality (1) and high yield (with little rejection) (2), which is an understandable combination, as the low rate of hydrocarbon rejection can mean the hydrocarbon product has a relatively high composition of low quality hydrocarbons, therefore resulting in low product quality. Candidate method B also exhibits notable input requirements and environmental benefits. This candidate method is representative of certain conventional methods that produce a lower quality bitumen product focusing on a high yield that neither rejects much low quality hydrocarbons, nor processes such low quality hydrocarbons into higher quality fractions. Thus, candidate method B pays a notable penalty due to the relatively low quality of the hydrocarbon product.

Candidate method C rejects a notable portion of low quality hydrocarbons and, in turn, the quality of the product (1) is higher than candidate method B. Candidate method B also has some advantages in terms of input requirements (3) and environmental benefits (4). An example of candidate method B could be a recovery or processing method that include deasphalting to remove a significant portion of asphaltenes (a low quality hydrocarbon), resulting in far less in the final hydrocarbon product. In contrast, candidate method B could be one that retains most of the asphaltenes in its final hydrocarbon product, which translates into a lower quality product.

Candidate method D is one that has high yield (2) (little rejection), high quality (1), however, very unfavourable input requirements (3) and environmental benefits (4). In fact, candidate D falls below the threshold in terms of environmental impact of the baseline method, as illustrated. Candidate method D could be one with high intensity processing, such as hydrotreatment methods, which enable upgrading of the lower quality fractions into higher quality fractions, but require significant investment and energy as well as resulting in high GHG emission intensity (e.g., for hydrogen production and treatment). Thus, candidate D may be discarded on one or more grounds, including failure to meet baseline environmental benefits and giving an overall sustainability profile that is below that of other candidate methods.

In the illustrated example, candidate method C is selected and deployed. On balance, this method exhibits the highest environmental benefit (4), has a relatively high product quality (1) and acceptable input requirements (3), all of which balance against the production yield (2) in this example.

Figure 2:
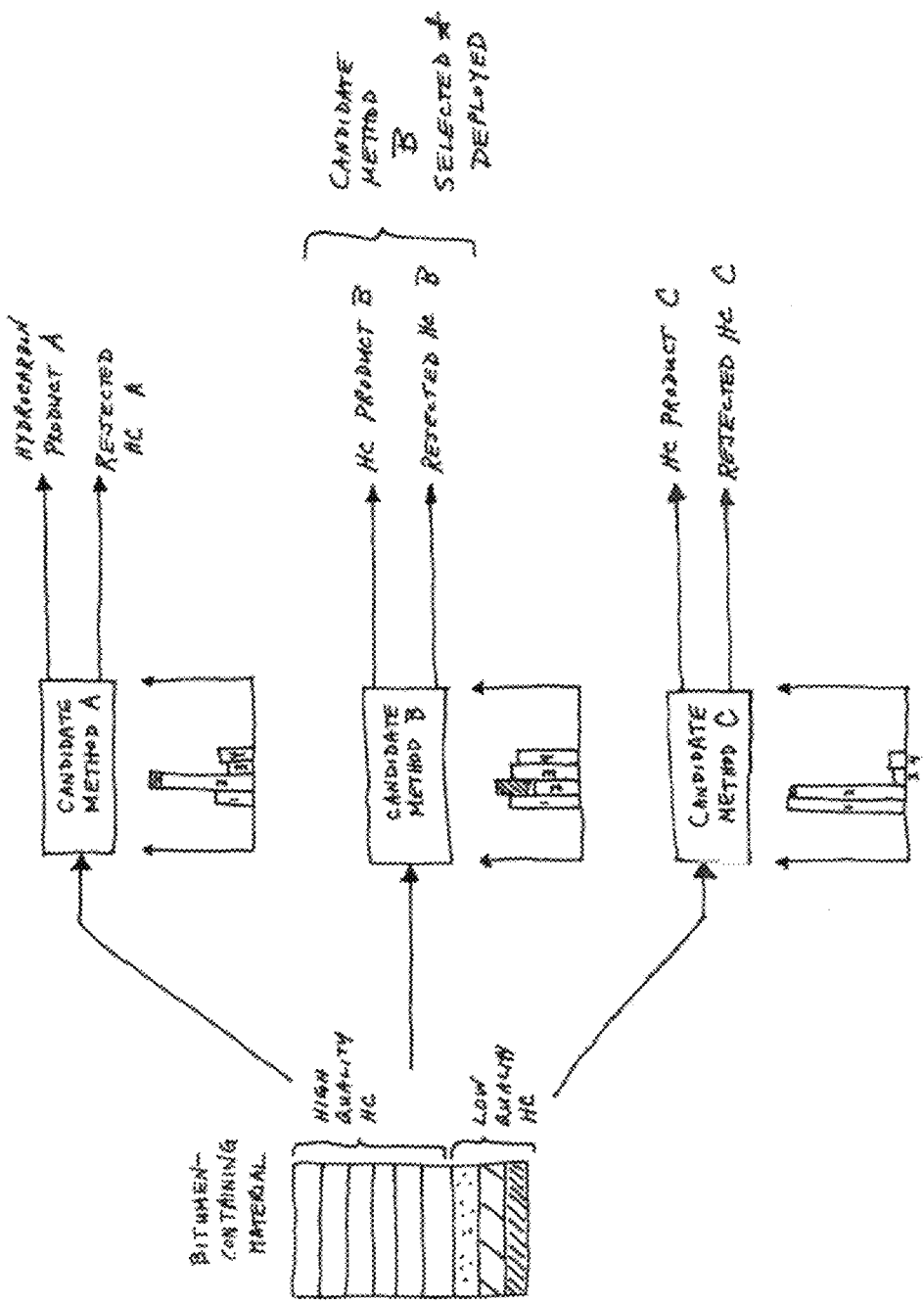
FIG. 2 is a schematic flow diagram with integrated graphs for different candidate methods.
Figure 3:
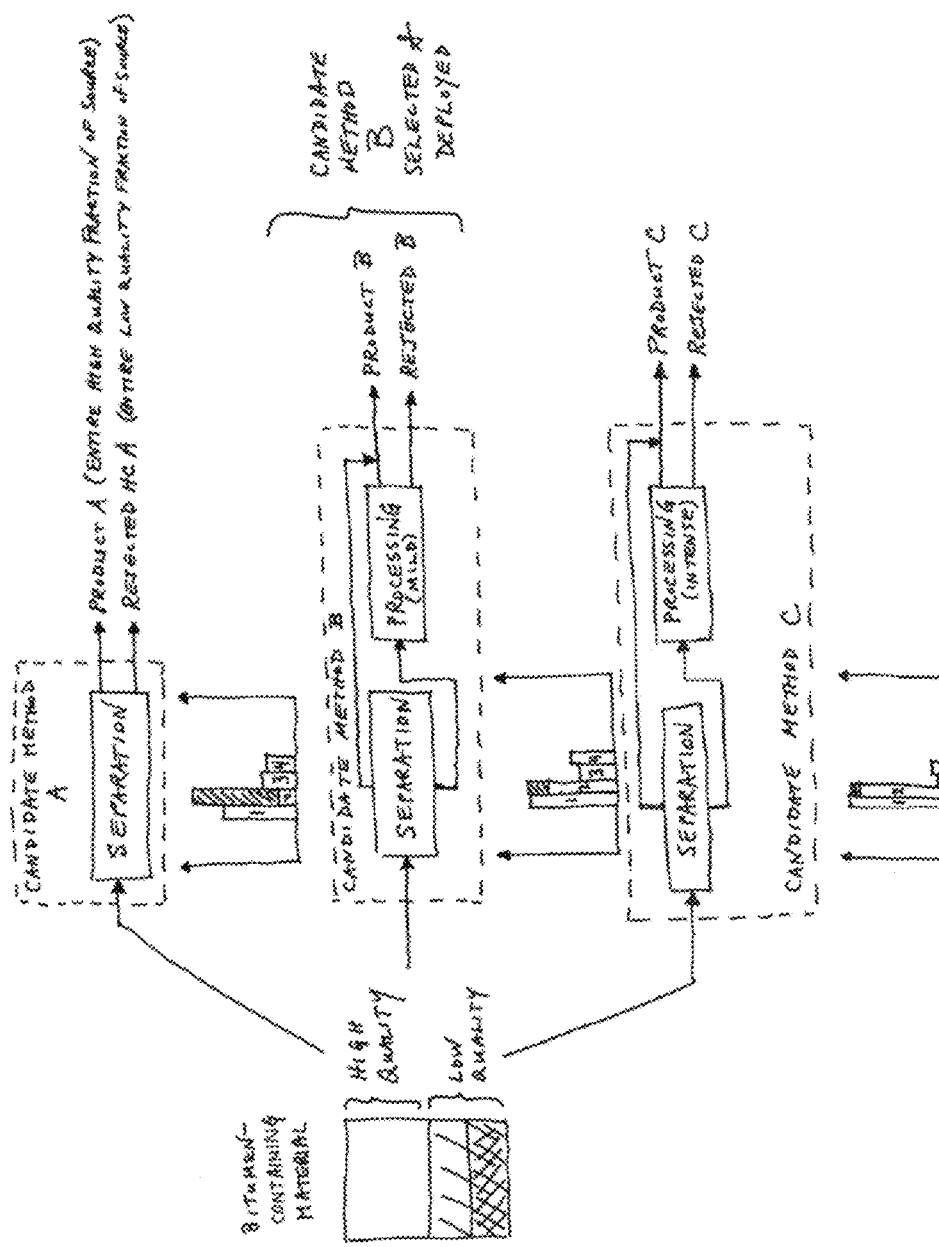
FIG. 3 is another schematic flow diagram with integrated graphs for different candidate methods.
Figure 4:
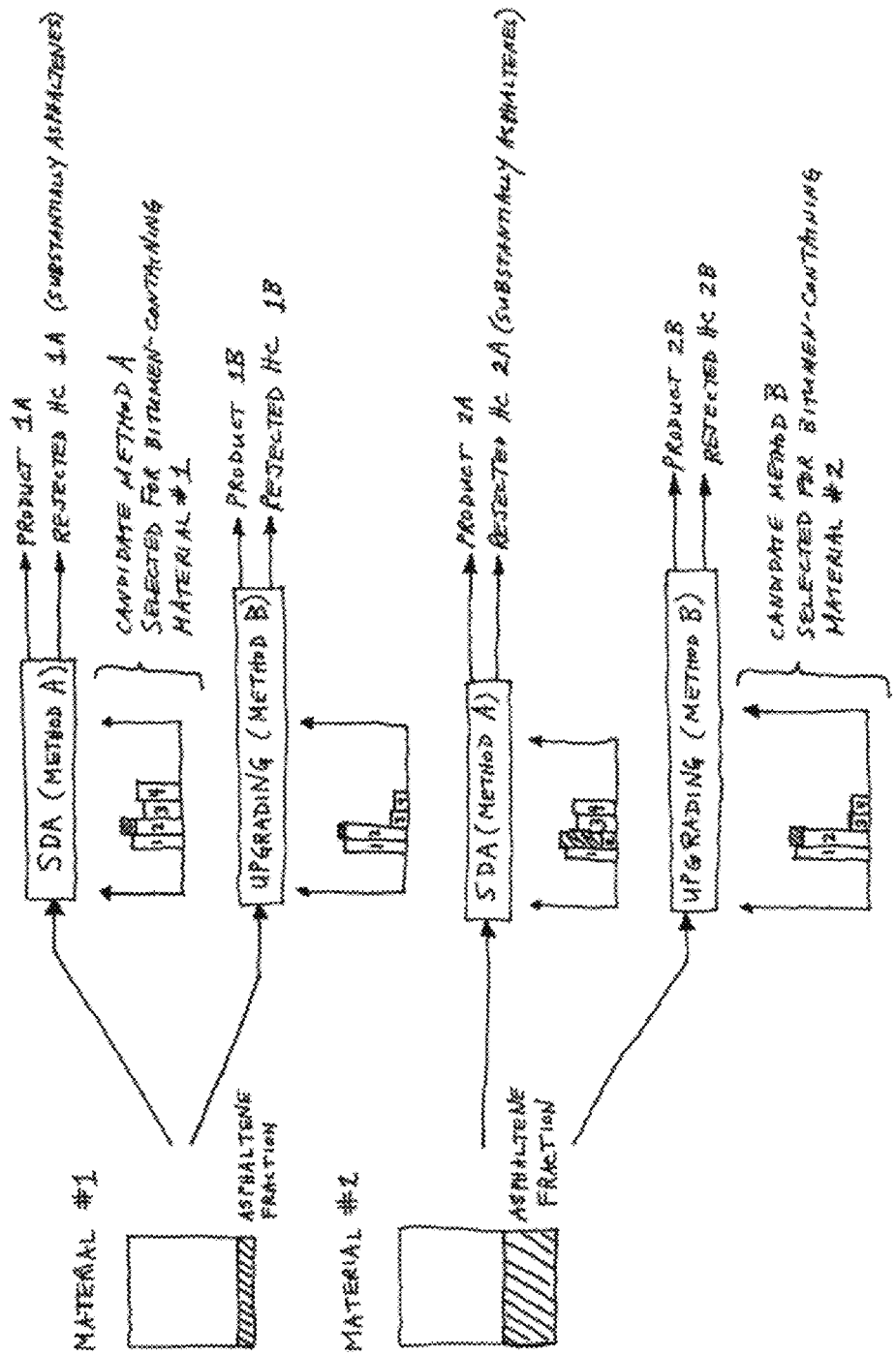
FIG. 4 is another schematic flow diagram with integrated graphs for different candidate methods.

FIGS. 2 to 4 provide general flow diagrams in addition to graphs, such as the one illustrated in FIG. 1, for each candidate method. It should be noted that reference letters for the candidate methods are not the same between the different FIGS. 1 to 4, e.g., candidate method A of FIG. 1 is not the same as candidate method A in FIGS. 2, 3, 4.

FIG. 2 shows that three candidate methods can be evaluated based on at least the four factors explained above, and the method with the most favorable sustainability profile is selected and deployed.

FIG. 3 shows more detail in terms of each candidate method and illustrates that the rejected hydrocarbons or hydrocarbon product can include hydrocarbon species that were in the original bitumen-containing material or were formed during process steps.

FIG. 4 illustrates that different bitumen-containing materials (1 and 2) can have an impact on the evaluation and selection of the preferred candidate method. In this illustrative example, the solvent deasphalting method A is selected for processing material (1) due in part to the asphaltene content of material (1) and the preferred overall sustainability of that method compared to the upgrading method B; whereas the upgrading method B is the selected method for processing material (2) due in part to the higher asphaltene content of material (2) and the benefit in terms of yield offsetting the decreased favorability of the input requirements and environmental benefits factors.

Figure 5:
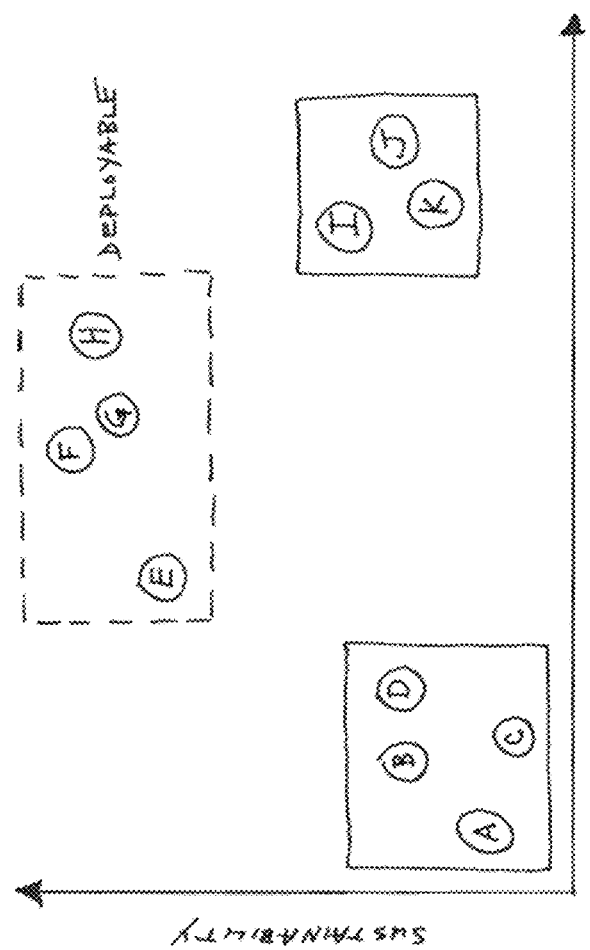
FIG. 5 is an illustrative graph of sustainability versus hydrocarbon rejection for different candidate methods.

FIG. 5 shows that various different candidate methods (A to K) can have substantially different carbon rejection characteristics that, in turn, impact the overall sustainability of the candidate methods. In some cases, a set of candidate methods can be assessed based on carbon rejection levels to identify lead candidate methods. In this illustrative example, candidate methods A to D, which may be various high-intensity upgrading methods or low-intensity methods that retain substantial low quality hydrocarbons in the products, reject very little carbon and may therefore have low sustainability indicators. Methods A to D may in fact score low in terms of overall sustainability due to different factors, i.e., due to high cost and environmental impacts for high-intensity methods and due to low quality for lower-intensity methods. Candidate methods I to K, on the other hand, may have very high rejection levels that result in corresponding yields that cannot be offset by other factors. Candidate methods E to H include notable hydrocarbon rejection levels but are each more balanced in terms of yield, quality, input requirements and environmental benefits. In some cases, an initial pass can be made to identify a subset of lead candidate methods (e.g., methods E to H in FIG. 5) prior to a more detailed evaluation.

Figure 6:
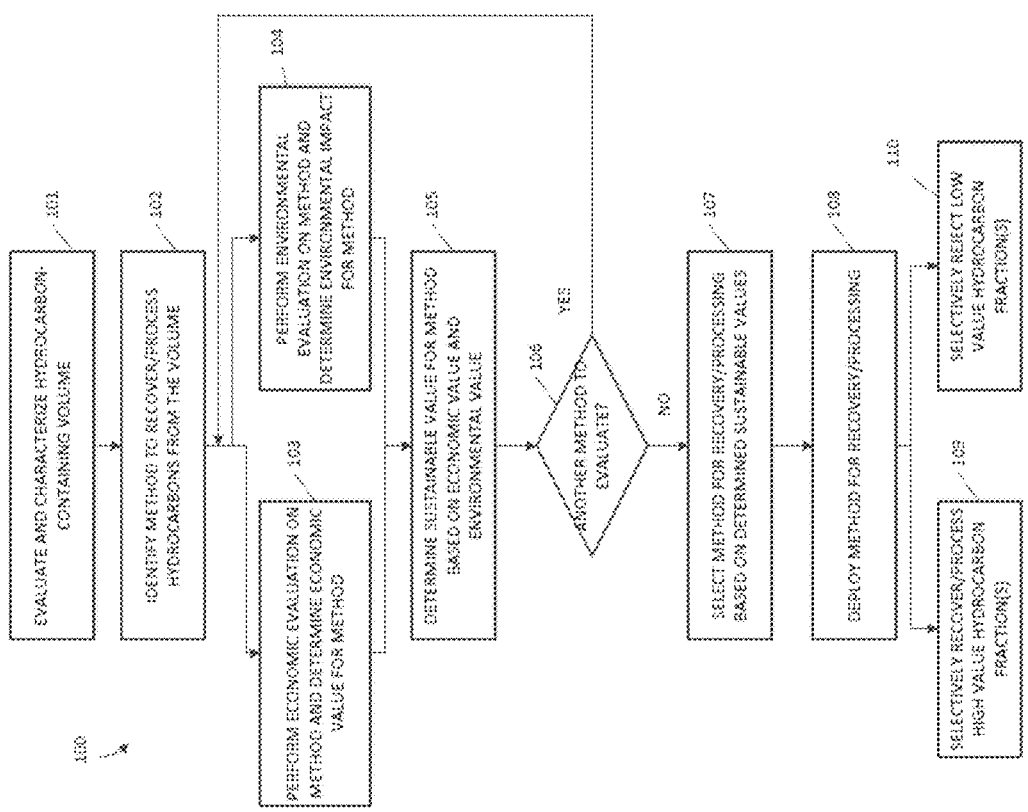
FIG. 6 is a flow diagram depicting a method for determining a sustainable value of an identified hydrocarbon fraction.

FIG. 6 shows an example methodology 100 for selectively recovering a high value fraction of hydrocarbons from a bitumen-containing reservoir or feedstream, while rejecting a low value fraction. For FIG. 6, the term "hydrocarbon-containing volume" is used and can be seen as generally corresponding to the expression "bitumen-containing material". The "hydrocarbon-containing volume" can be a hydrocarbon-containing reservoir (or a portion thereof) or a hydrocarbon-containing feedstream derived from any number of possible sources. In instances where the selective recovery method can be described to apply to both types of hydrocarbon-containing volumes (reservoir or feedstream), the more generic term may be used or the term bitumen-containing material may be used. In instances where the specific activities undertaken for a particular step differ depending on the type of hydrocarbon-containing volume, more specific terms may be used.

Referring to FIG. 6, the hydrocarbon-containing volume is evaluated against a set of criteria in order to characterize the hydrocarbons in the hydrocarbon-containing volume (Step 101). By such evaluation and characterization, high value fractions and low value fractions of recoverable or processable hydrocarbons (as the case may be) can be identified within the volume. This characterization step can enable the hydrocarbons in the hydrocarbon-containing volume to be identified and characterized in terms of one or more properties, as discussed further above.

For a reservoir, such evaluation can include: determining the total or recoverable hydrocarbon volume (typically represented in number of barrels, bbls); determining the distribution of hydrocarbons within the reservoir; estimating the volume of hydrocarbons recoverable by a particular method; determining the quality of the recoverable hydrocarbons (based on various properties and characterization techniques); and determining the estimated value of products derivable from the recoverable hydrocarbon volume. It is expected that for a bitumen-bearing reservoir, there will be variations in the evaluation of hydrocarbons with the reservoir, resulting in some evaluating higher than others, when measured against selected criteria. For example, low carbon number hydrocarbons present in the reservoir may result in a higher estimated value of derivable products.

Based on the evaluation, fractions of hydrocarbons within the reservoir can be identified and characterized, e.g., as higher value fractions and lower value fractions. Here it is noted that the higher or lower "value" of the hydrocarbons can be represented by higher or lower "quality" of the hydrocarbons, insofar as higher quality corresponds to higher value. For example, low and high sulfur content in characterized hydrocarbons would correspond respectively to high and low quality as well as high and low value, since sulfur content reduces quality and value of the hydrocarbon fraction.

The information used to perform the evaluation and subsequent characterization can be obtained from a variety of sources, including without limitation: by taking core samples or fluid samples to determine composition, conducting seismic analysis to determine composition and distribution, consulting a pre-determined mine map or reservoir map to determine composition and distribution, or other analytical, empirical or computational methods. Initially, the quality or value of the hydrocarbons can be determined as per standard methods of analysis to determine the scope of the economic benefit that can be gained from hydrocarbon recovery efforts. A preliminary assessment of the potential product quality and production yield that could be obtainable based on the hydrocarbon-containing volume can be performed to determine whether that particular hydrocarbon-containing volume has sufficient potential value to merit further evaluation.

In another implementation, hydrocarbons have already been recovered from a reservoir via surface mining or in situ recovery, and a hydrocarbon-containing feedstream is evaluated to characterize a high value hydrocarbon fraction and a low value hydrocarbon fraction. Example feedstreams include, without limitation, a hydrotransport slurry of ore and water, a non-aqueous oil sands slurry stream, an in situ produced emulsion, bitumen froth, diluted bitumen, non-upgraded bitumen stream, a diluted depleted bitumen stream, and a volume of hydrocarbon transportable by rail or pipeline. Evaluation of the hydrocarbon-containing feedstream can include: determining the volume (or mass) and distribution of various hydrocarbon and non-hydrocarbon species within the feedstream, determining viscosity and transportability of the feedstream, determining the volume (or mass) of hydrocarbons processable by a particular method, determining the necessity of additives, chemicals, or diluent needed to process the feedstream, and determining the estimated quality or value of products derivable from the feedstream. For a given feedstream, there will be variations in the evaluation of hydrocarbons within the feedstream, with some hydrocarbons evaluated as higher quality, more valuable, or more processable, than others. For example, smaller, saturated hydrocarbon molecules will be evaluated as having higher value when considering processing intensity as a criterion, since minimal processing is necessary in order to derive a high value product (nevertheless with the understanding that such high quality smaller molecules have a minimum threshold carbon number to exclude very light hydrocarbons such as methane which would not be considered high quality in this context). By contrast, heavy hydrocarbons and asphaltenes can be evaluated as having lower value when considering processing intensity, as many high intensity processing steps are typically necessarily in order to derive products from these large hydrocarbons. Similarly, hydrocarbons that can be combined to meet pipeline specifications will be evaluated as having a high value when considering transportability, while hydrocarbons that are more viscous and are difficult to separate from contaminants (e.g., sulfur, metals, etc.) will be evaluated as having a low value when considering transportability.

The criteria for identification and characterization of a higher value hydrocarbon fraction and a lower value hydrocarbon fraction can change depending on many factors, such as the price of oil, the processing methods available, and the market demand for intermediate streams or derived products. For example, when the price of natural gas is high, a natural gas fraction within a reservoir can be identified as a higher value fraction. Alternatively, when heavy mineral byproducts can be recovered from mined ore and sold at high value, intermediate streams or waste streams containing the heavy minerals can be identified as higher value fractions.

The hydrocarbon-containing volume can be further represented as a number of recoverable and/or processable fractions of the estimated total, each of which can also be characterized. It is generally understood that fractions can be recovered and processed separately or together, and can be evaluated on the basis of qualitative or quantitative characterization. For example, characterization of hydrocarbon fractions can be by composition, viscosity, or by recoverability or processability using a particular method. Fractions can further be characterized based on location within the reservoir or based on ore quality, and a volume estimate (e.g., bbls) of each fraction can be provided. Characterization of a fraction can consider downstream processability, using factors such as processing intensity (e.g., low quality ore that would require more intense processing during recovery; slurry containing degraded bitumen can require treatment with expensive additives; high asphaltenes content would require more intense processing to derive products).

For the purposes of this description, the representation of the reservoir or feedstream hydrocarbons as being divisible into a number of individual fractions of the total volume, when characterized on a particular basis (for example, by carbon number), is referred to as a fraction set. Typically, fractions based on narrow hydrocarbon composition ranges cannot be recovered from the reservoir independently, but recovery methods would instead recover hydrocarbons across a range of compositions. Therefore, a hydrocarbon fraction can also be characterized on the basis of its ability to be recovered or processed by a particular recovery or processing method, with less emphasis on other evaluation criteria (e.g., hydrocarbon composition, quality, distribution, location within the reservoir). Further, a hydrocarbon-containing volume can be characterized into a high value hydrocarbon fraction and a low value hydrocarbon fraction based on the economic value of potential end products or based on other factors.

Based on the characterization of the hydrocarbon-containing volume, specific potential methods, or combinations of methods, for recovery and/or processing of hydrocarbons from the hydrocarbon-containing volume can be identified (Step 102) for preferential recovery or processing of higher value hydrocarbon fractions. Such methods and combinations of methods can generally be referred to as candidate methods, each of which can include one or more unit operations. It should thus be understood that candidate methods can be relatively simple (e.g., a single unit operation that includes one or a limited number of vessels) or can be relatively complex (e.g., in situ recovery facility, an oil sands mining and extraction facility, an upgrading facility, or an integrated bitumen recovery and processing operation that includes multiple facilities and bitumen sources).

In an in situ recovery example, potential hydrocarbon recovery methods can include a thermal energy-based recovery method such as steam assisted gravity drainage (SAGD); a solvent-based recovery method such as vapor extraction (VAPEX); an in situ combustion recovery method; or a concurrent or sequential combination thereof. Each recovery method will recover a distinct mixture of hydrocarbons.

In a surface mining example, potential hydrocarbon recovery methods can include hot water extraction followed by naphthenic froth treatment; hot water extraction followed by paraffinic froth treatment; or solvent-based extraction. Each option will result in a distinct mixture of hydrocarbons that can be further processed to derive products for sale.

In a processing example, potential processing methods can include at least one of atmospheric distillation, vacuum distillation, catalytic upgrading, coking, or hydroprocessing. In some implementations, a processing method can include several distinct processing steps that are considered together, and low value hydrocarbon fractions can be rejected at one or more of the individual processing steps. In addition, a processing step can result in two separate hydrocarbon streams that can each be handled by separate downstream process steps. The derived products can therefore refer to any intermediate hydrocarbon stream that results from a processing step.

In a further implementation, recovery and processing combinations can be proposed together in a single flow sheet for recovery and processing of hydrocarbons from a hydrocarbon-containing volume to derive a series of intermediate and final products. As such, a series of complete flow sheets (i.e., recovery/processing method combinations) can be proposed to recover and process hydrocarbons from the hydrocarbon-containing volume, to derive final products that can be sold. More generally, for any hydrocarbon-containing volume, various recovery and processing combinations can be identified.

Referring again to FIG. 6, for each recovery method, processing method, or recovery/processing combination identified as an option for recovering/processing the hydrocarbon-containing volume (i.e., a "candidate method"), an economic evaluation (Step 103) and an environmental evaluation (Step 104) can be undertaken. The economic and environmental evaluations can be prepared for each recovery method, processing method, or recovery/processing combination independently. Alternatively, each economic and environmental evaluation can be prepared by comparison to a benchmark method, where the evaluation of each recovery method, processing method, or combination is represented as the evaluated difference from the benchmark method. It is noted that the benchmark method for this evaluation can be the same as the baseline method used for the environmental benefits threshold. More regarding benchmarking is described further below.

In instances where a fraction of the hydrocarbon-containing volume can be recovered or processed independently of other fractions within the volume, steps 103 onwards in the method 100 can be undertaken with respect to the particular fraction. In other instances where the fractions cannot be independently recovered or processed, then steps 103 onwards are undertaken in respect of the fraction set. For the purpose of an example, the method 100 is described below in reference to a fraction set. Whether or not a specific fraction in the fraction set can be independently recovered or processed will depend on which method for recovery/processing is used.

An economic evaluation can involve determining the difference between the economic value (e.g., market value) of the product(s) that can be derived from the fraction set by recovery or processing using a particular method, and the economic costs of the method or combination used to derive the product(s).

The economic evaluation and environmental evaluation can be considered together in order to determine a sustainable value 105 or sustainability indicator (described in more detail below) for each method or combination. Typically, multiple recovery methods, processing methods, and recovery/processing combinations can be identified for any fraction set, each rejecting different hydrocarbon fractions from the set and resulting in different products. The method 100 shown in FIG. 6 therefore contemplates repeating the identification 102 and evaluations 103, 104 for multiple available recovery or processing methods and combinations.

Determining a sustainable value for each method can include re-evaluation of a previously evaluated method, but at revised operating conditions, in an attempt to improve the sustainable value of the method. Such re-evaluation can be useful in identifying operating conditions that will provide the highest possible sustainable value for each method. It is also noted that several candidate methods can be evaluated where the main difference between the candidate methods is the operating conditions, and therefore the selection of the candidate method amounts to a selection of operating conditions of general methodology for hydrocarbon production. Further to determination of the highest possible sustainable value for each recovery/processing method, a method (or combination of methods) is ultimately selected (Step 107) for recovery/processing of the hydrocarbons. Generally, the selected method or method combination will be the method with the highest sustainable value, when a sustainable value or indicator is generated for each candidate method. When a sustainability indicator is not determined, other approaches for selection are used, as described herein.

The selected method for recovery/processing is employed on the fraction set (Step 108) to recover and/or process hydrocarbons. Over time, this step can involve adjusting operating parameters to improve the sustainable value of the selected method(s) as one or more conditions change. The sustainable value of the selected method can be re-evaluated and monitored over time to identify operational adjustments that can improve the efficiency, economic value, or environmental value of the method. For example, changes in reservoir characteristics during hydrocarbon recovery, changes in relative value or demand for products, or changes in price of operating inputs, can impact the sustainable value and appropriate adjustments can be made to operating conditions over time for optimization purposes.

In implementations where the recovery/processing method is applied to the entire fraction set, to selectively recover/process high value hydrocarbons (Step 109), one or more fractions will also selectively be unrecovered or unprocessed, that is, those fractions characterized as low value fractions, amounting to hydrocarbon rejection (Step 110). In implementations where the recovery/processing method is applied to a particular fraction that can be recovered/processed independently of other fractions, the action of choosing to selectively recover/process the high value hydrocarbon fraction, and the resulting failure to recover/process the low value fractions, serves as both the selective recovery/processing step (Step 109) and as the hydrocarbon rejection step (Step 110).

In some cases, evaluating the sustainability of various recovery and processing methods (i.e., candidate methods) allows a traditional maximum volumetric yield recovery and processing approach to be directly compared to a more innovative, lower yield, lower intensity recovery and processing approach. For each recovery and/or processing method, an economic value (considering the market value of products and the economic costs of recovery/processing) and an environmental evaluation of the recovery and/or processing methods can be considered together to determine the sustainable value. Each recovery or processing alternative will inherently be associated with a different volume (e.g., production yield) and composition of both derived products (e.g., product quality) and rejected hydrocarbons, and the timing and means by which the hydrocarbon is rejected will also differ. Comparing the sustainable value of each alternative can ultimately determine which hydrocarbon fractions will be rejected, by selection of the most suitable (highest sustainable value) method or combination. The sustainable value determination as described herein can aid in the selection of recovery and processing approaches that preferentially favour recovery and processing of high value hydrocarbon fractions, while selecting and substantially rejecting low value hydrocarbons.

Figure 7:
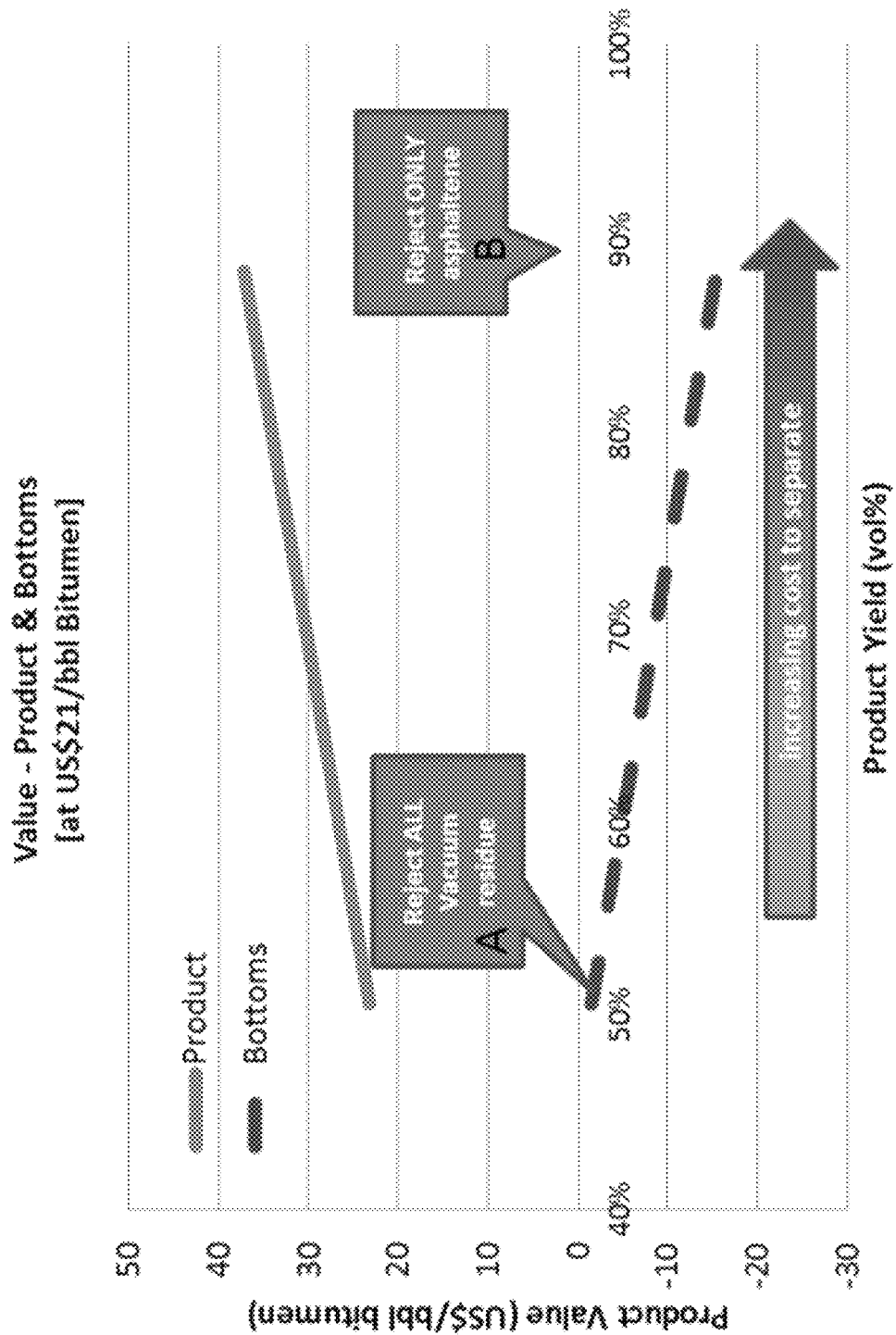
FIG. 7 is a graph depicting the difference in value between a hydrocarbon product fraction and a bottoms fraction.

With reference to FIG. 7, a hypothetical graph is provided to illustrate, for a US$21/bbl bitumen, the economic relationship between the value of a lower value hydrocarbon fraction (bottoms fraction of a barrel of bitumen based on the boiling point range), and the higher value hydrocarbon fraction (top fraction of the barrel of bitumen based on the boiling point range) at various product yields, where the product yield represents the top fraction of the barrel. Point A noted on the graph represents a product yield of 50%, indicating that the top 50% of the barrel is retained and sold or processed to derive products and the bottom 50% of the barrel is rejected. Point B noted on the graph represents a product yield of 90%, indicating that the top 90% of the barrel is retained and sold as product for processing and the bottom 10% of the barrel is rejected. Treating the market value of the total barrel volume (retained portion plus rejected portion) as a constant (i.e., because it represents the market value of an entire barrel of bitumen, including both high value and low value fractions), the sum of both fractions (retained and rejected) must therefore be equivalent to the US$21/bbl bitumen value. Based on this presumption, if only a fraction of the barrel is recovered or processed and sold as product at a known price, the negative value associated with recovering or processing the balance of the barrel can be calculated. That is, since the economic value of the lighter, higher value hydrocarbon products is known (market price), the economic value of the rejected fraction for each product yield can be calculated by subtracting the market value of the product price from the US$21/bbl price. As shown in the graph, for this hypothetical separation on the basis of boiling point range, the bottoms fraction therefore represents an ever-increasing negative product value as the product yield is increased.

The graph in FIG. 7 illustrates the potential economic benefit of rejecting low value hydrocarbon fractions rather than combining them together with higher value fractions. As shown, the product fraction in each case exceeds the market price of a barrel of bitumen. As illustrated in FIG. 7, increasing the product yield to retain more of the higher value hydrocarbon fraction and reject less of the bottoms fraction will further increase the market price that can be obtained for the product fraction. Therefore, a product yield of 90% would seem to provide a more desirable market price, assuming one could selectively recover only the top 90% of the recoverable hydrocarbons from the reservoir. Even with this assumption, however, recovery and processing to derive products from the heavy portion of the 90% fraction can significantly increase processing costs and environmental impact, compared with recovery and processing the 50% product, due to the presence of heavier, more complex hydrocarbons within the 90% product that must be recovered and processed at increased cost. Higher intensity processing methods are typically used to maximize product yield from heavier hydrocarbons, for example coking and hydroprocessing, and therefore the economic costs of recovering and processing an increasingly heavy hydrocarbon content within the product fraction may discount an otherwise high product value. Therefore, an economic evaluation ideally considers both the market price of the product and the cost to recover and process the hydrocarbons to derive the products. For each candidate method, the product quality, production yield and input requirements are relevant to assessing overall feasibility.

Figure 8:
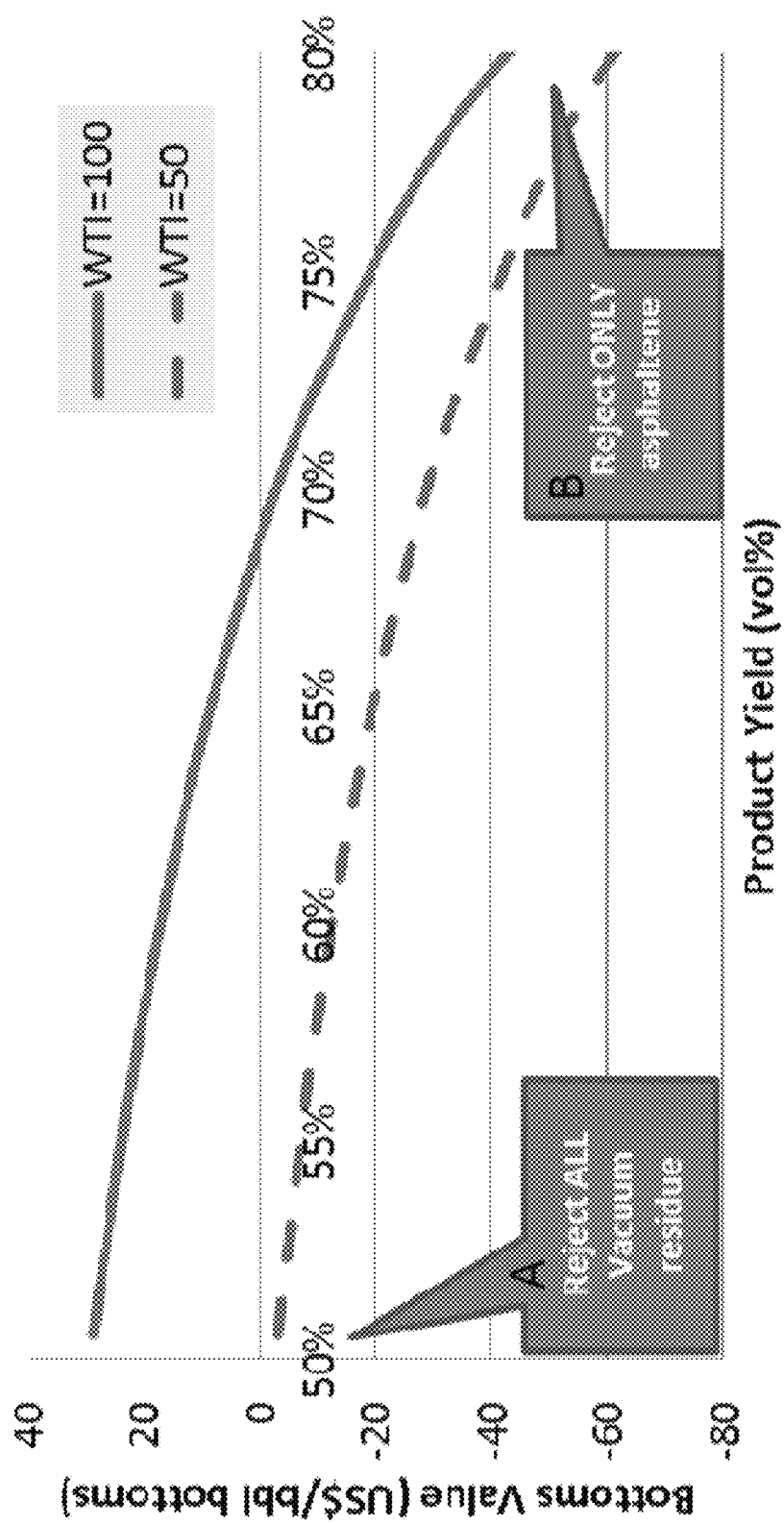
FIG. 8 is a graph showing the change in value of bottoms fractions at different crude prices.

As a further consideration, the determination of sustainable value for the same hydrocarbon fraction, or for the same fraction/process/product set can change with time, for example based on the price of oil, the cost and availability of specific recovery or processing technology, the costs and availability of additives or equipment, and the cost of transporting feedstreams or products. With reference to FIG. 8, the value of the lower value hydrocarbon fraction for each product yield is shown when the price of oil (using West Texas Intermediate, WTI, as a benchmark) is at two disparate values. At point A, which represents a 50% product yield, the value of the bottoms fraction is approximately US$30/bbl bottoms when WTI is US$100/bbl and only reaches a negative value at approximately the 70% product yield. By contrast, the value of the same bottoms fraction is about US$0/bbl when WTI is at US$50/bbl, and also declines further with increasing product yields. In high WTI price environments, a higher cut point can therefore be feasible.

As is evident from FIG. 8, adjusting the product yield for rejection of the bottoms fraction based on variables, such as the price of oil, can be relevant to maximizing the sustainable value from hydrocarbon recovery and processing operations. The ability to reject low value hydrocarbon fractions is therefore more beneficial at low crude prices, when only limited economic value can be derived from higher value hydrocarbon fractions, typically at the same cost as during a time of higher crude prices. In some cases, a candidate method can be selected based in part on its ability to selectively reject low quality hydrocarbons as well as its adaptability to reject different quantities or types of hydrocarbons. For instance, a solvent deasphalting method that has high selectivity to reject asphaltenes as well as high adjustability to reject different quantities of asphaltenes by modulating solvent-to-bitumen ratios or temperature can be favourable since such a method could be adjusted over time in response to changes in the market. Another example of a favourable candidate method is one that can adjust between rejection and upgrading of a certain portion or fraction of lower quality hydrocarbons.

The ability to recover and process hydrocarbon fractions based on an ideal product yield, and rejecting the bottoms fraction, for example by leaving the bottoms fraction in the reservoir or rejecting the bottoms fraction as waste without any processing, is highly dependent on the method used to recover and process the hydrocarbons. Methods or technologies that allow some degree of flexibility in adjusting the product yield and rejection of lower value hydrocarbons will be particularly useful in reacting to fluctuations in the price of oil.

In some implementations, a sustainable value can be determined qualitatively based on calculated or perceived economic and environmental values. In some implementations, a quantitative sustainable value based on the economic and environmental evaluations can be determined using a formula. This number can be determined from an equation that considers environmental value together with economic value for a proposed recovery and/or processing method, or combination thereof. Analogous approaches can be used for determining sustainability indicators of different candidate methods, where the variables relate to produce quality, production yield, input requirements and environmental benefits indicators that can be determined based on various methodologies and can have various units for aggregation or combination into a single sustainability indicator.

The below generic equation allows a determination of sustainable value of a hydrocarbon recovery or processing method by considering both economic evaluation and environmental evaluation:

$$\text{Sustainable value} = [X_1 \times (\text{Economic Value})] + [X_2 \times (\text{Environmental Value})]$$

where:

$X_1$ is the weight ranking for the Economic Value and can be any value, greater than 0.

$X_2$ is the weight ranking for the Environmental Value, and can be any value, greater than 0.

Economic Value is determined from the economic evaluation, and can be represented as the value attributed to the method, or as the difference in value in comparison to a benchmark method. The Economic Value can be a positive or negative number.

Environmental Value is determined from the environmental evaluation, and can be represented as the value attributed to the method, or as the difference in value in comparison to a benchmark method. The Environmental Value can be a positive or negative number.

The weight rankings $X_1$ and $X_2$ are selected based on economic and environmental objectives, and are intended to provide the desired degree of relative comparability between the two evaluations. That is, the economic evaluation will generally result in a positive or negative dollar value/bbl. Depending on the environmental evaluation that is conducted, the units of the environmental evaluation may not be directly comparable to the economic evaluation, so the weight rankings $X_1$ and $X_2$ are selected to bring comparability to the evaluations. In general, the weight rankings are selected such that the weighted economic evaluation will typically be a higher value than the weighted environmental evaluation, with the result that the weighted environmental evaluation modifies the economic evaluation to a degree.

In some implementations, the weighted environmental evaluation will be a fraction of the economic evaluation (e.g., between one quarter and one twentieth). The weight rankings can be selected before or after performing the economic and environmental evaluations in order to assign a suitable weighting that normalizes the respective values. In various implementations, $X_1$ can be greater than, less than, or equal to $X_2$. When different candidate methods are being compared on the basis of sustainable values, the weight rankings used for the sustainable values are the same for each candidate method.

As noted above, the primary driver for recovery or processing of hydrocarbons has generally been to maximize volumetric yield of hydrocarbons produced from a reservoir, or to maximize the volume or value of products derived from a feedstream. Within a maximum yield framework, some degree of method selection or adjustment of recovery or processing conditions would be possible to optimize economic value, but the degree of such selection and adjustment would be minimal, being constrained by the focus on maximizing product yield. Optimization of economic value generally has not been determined without the constraint of the requirement to maximize yield. Further, the economic value proposition conventionally has not been modified by consideration of an environmental evaluation. That is, if one were to relate the equation above to a conventional approach to hydrocarbon recovery and processing, the value of $X_2$ would be set to 0, and decisions largely have been determined by an estimation of economic value alone, with environmental considerations being considered as part of the economic evaluation in the form of environmental impact mitigation costs.

The above sustainable value equation, when used as described, allows an economic evaluation and an environmental evaluation to be considered together. The user can determine an appropriate weighting of each evaluation, based on economic and environmental value objectives. The user that performs this sustainability evaluation can be an operator that is involved in the subsequent deployment and operation of the selected method, or an external entity that provides advice to operators on method design, engineering, and implementation.

In some implementations, $X_1$ and $X_2$ are selected so as to distinguish the sustainable value between methods that are similar in economic value, but in which one method has significantly greater environmental value or benefits relative to a baseline method. In these implementations, $X_2$ can be selected such that the weighted environmental evaluation will be a fraction of the economic value. In some implementations, $X_2$ is selected such that the environmental evaluation modifies the economic evaluation by an amount that approximates the magnitude of the difference between the economic values of the methods being evaluated. For example, when more than two candidate methods under consideration, a mean or an average difference in economic values can be taken as the guideline for the weighting of the environmental value. In general, as $X_2$ is increased, a greater emphasis is placed on the environmental evaluation in a determination of sustainable value, which will more strongly favor a method selection that has greater environmental value and avoids significant environmental impact.

In some implementations, $X_2$ can be selected such that the environmental evaluation is weighted to approximate an economic cost or penalty associated with an environmental impact. For example, where monetary penalties exist for greenhouse gas emissions, water usage, gas flaring, or other environmental impacts, $X_2$ can be selected as a negative weighting to result in a subtraction of environmental impact that approximates a dollar figure associated with the monetary penalty of the corresponding environmental impact. In this regard, it is noted that the impact of environmental factors has a dual-impact in the evaluation of the candidate methods, i.e., first, in the context of cost or input requirements for handling environmental impacts of the candidate methods, and second in terms of the environmental benefits that are achieved by the candidate methods compared to the baseline method.

The economic value of recovery methods can be calculated based on the difference between the market value of products recovered from the reservoir, and the estimated capital and/or operating and/or remediation costs. In one implementation, the Economic Value used in the sustainable value equation is determined as follows:

Economic Value (on a per bbl basis)=Product value−Recovery cost−Remediation costs In some implementations, the economic value can be calculated by comparison to the economic value of a benchmark method, i.e., it is a relative value. That is, the economic value of each identified method option is calculated using the difference in product value (based on differences in product yield and product quality), and the difference in capital and/or operating costs and/or remediation costs in comparison to a benchmark method. When all identified recovery methods have been compared to the benchmark, some of the methods can have a positive economic value, indicating that the economic value is more favorable than the benchmark method, while others will have a negative economic value, indicating that the economic value is less favorable than the benchmark method.

The value of all products can be considered in the economic value determination. For example, product value can include hydrocarbon products that will ultimately be sold, power generated, and byproducts such as mineral concentrates, sulfur, and waste streams. The costs can include capital and operating costs of the recovery process, costs of regulatory, government, and stakeholder consultations, costs to remediate or mitigate environmental damage, costs to handle tailings or other waste streams, and royalties, fees, or regulatory penalties that may be payable based on the recovery scheme.

Some recovery methods such as solvent-based recovery can have a low product yield and inherently produce only higher value products while rejecting lower value hydrocarbon fractions. This is particularly the case for methods that employ paraffinic solvents at concentrations and operating conditions sufficient to cause precipitation of asphaltenes which then are not retained in the produce streams. Other technologies such as steam-based recovery methods or surface mining are not able to provide specific control over the composition of the hydrocarbons that are recovered from the reservoir, but are instead operated to maximize the volume of hydrocarbons recovered from the reservoir. When a particular recovery technology is expected to recover low value hydrocarbons together with high value hydrocarbons, separation and rejection of the low value hydrocarbons can instead occur at surface, which will be considered in the sustainable value of processing various hydrocarbon fractions (discussed below), or the sustainable value can be determined based on a recovery/processing method combination. To the extent surface separation of hydrocarbon fractions is feasible, the rejected fraction can be held on-site for de-prioritized processing (for example during higher oil prices), or otherwise safely disposed of in a geologic setting.

For surface mining projects with higher capital costs and high remediation costs, a lower percentage of carbon rejection may be appropriate than for in situ recovery projects, in order to provide sufficient economic benefit to outweigh the higher recovery costs and land remediation costs of surface mining. Further, as surface mining involves excavation of overburden and mining of undesirable ore (e.g., high fines ore, low bitumen quality ore) in order to access desirable ore, the costs of mining the overburden and undesirable ore, as well as the costs/benefits of using this low value material as fill or construction material, or otherwise disposing of this material, can be factored into the sustainable value of processing mined hydrocarbon fractions. That is, in surface mining projects, larger recovery volumes will be expected, and carbon rejection is more likely to occur after recovery of bitumen from ore. Consequently, the sustainable value can instead be evaluated as a recovery/processing combination. Processing can include slurry preparation, extraction processing and/or upgrading processing. By considering the most suitable location and means to reject carbon over the entire operation, the highest sustainable value recovery/processing combination can be identified.

Considering the economic value for processing methods, two significant sources of cost and environmental footprint in processing heavy hydrocarbon fractions are the separation and cracking of large hydrocarbons, and the addition of hydrogen to selectively hydroprocess hydrocarbon molecules. Historically, processing technologies have been directed toward maximizing the product yield and product quality derivable from the recovered hydrocarbons, even at high economic cost, with a focus on maximizing volumetric yield and product quality. Lower energy intensity processing technologies (such as visbreaking, solvent deasphalting, supercritical solvent separation, saturation of hydrocarbon molecules by reaction with a hydrogen donor that is not hydrogen gas, hydroprocessing at sub-maximal processing intensity, biological conversion of complex hydrocarbons, non-thermal physical processing steps, or non-thermal chemical processing steps, or combinations thereof) have historically not been used as they are associated with lower product yield, lower product quality, or longer processing time.

An additional significant cost of processing is the transport of heavy hydrocarbons to a processing facility. While pipeline transport is the most economical mode of transporting hydrocarbons, heavy fractions must be diluted with diluent in order to meet pipeline specifications. Diluent costs add significant expense and reduce capacity of the transportation process, and therefore to the cost of processing these heavier streams. Transport and diluent costs are factored into the economic evaluation. In addition, the energy consumed in transporting heavy hydrocarbons is increased. Thus, methods that do not require diluent addition may be quite favorable in terms of input requirements.

An environmental evaluation can include many factors, such as the direct costs of mitigation and/or remediation of environmental impact (e.g., per barrel of product), and the number of tonnes of greenhouse gas (GHG) produced per barrel of product (i.e., GHG emission intensity). Other factors can also be considered in assessing environmental value, such as greenhouse gas production, land disturbance, wildlife disturbance, vegetation impact, water usage, fresh water requirements, risks to nearby communities, etc.

Appropriate environmental value factors can be quantified, rated, or ranked to arrive at an environmental evaluation for each recovery and/or processing method or combination. The environmental evaluation can then be considered together with the economic evaluation. For example, greenhouse gas emissions for each recovery method and processing method can be estimated in units of tonnes emitted per barrel of hydrocarbon product.

Quantifiable environmental value metrics can be considered within a sustainable value equation. Each environmental value metric can further be independently weighted as appropriate. In one implementation, the environmental value used in the sustainable value equation is determined as follows:

$$\text{Environmental Value} = [X_A \times (\text{GHG tonnes/bbl})] + [X_B \times \{(\text{acres of land disturbed}) - (\text{acres of land reclaimable})\}] + [X_C \times (\text{water usage})]$$

The above equation can be used to weigh various environmental factors into the sustainable value determination, when considering the identified methods to recover and process hydrocarbons. The environmental value can be a positive or negative number, depending on how the environmental value is derived.

In some implementations, the environmental value can be calculated by comparison of environmental metrics between each identified method and a benchmark method. When all identified recovery methods have been compared to the benchmark, some of the methods can have a positive environmental value, indicating that the environmental value is more favorable than the benchmark method, while others can have a negative environmental value, indicating that the environmental value is less favorable than the benchmark method.

The weight rankings $X_A$, $X_B$, $X_C$, and $X_D$ can be selected to normalize each impact, and to emphasize or de-emphasize environmental impacts as desired. For example, reducing greenhouse gas emissions could be a primary objective for new in-situ hydrocarbon recovery techniques, while reduced land disturbance could be a primary objective in new mining and extraction methods. As part of the environmental evaluation, a qualitative or quantitative value can be attributed to each environmental impact. Where such evaluation can be quantified, the impact can be considered in the sustainable value equation. For example, the environmental impacts that can be quantified and considered in the equation include, without limitation, greenhouse gas emissions, land disturbance, water usage, wildlife impact, and vegetation impact. Environmental values and weight rankings can also be determined based on various methodologies, such as willingness-to-pay or willingness-to-sell analyses or other methods for environment valuation.

The environmental evaluation can also consider environmental impact mitigation factors such as water recycling, land reclamation, waste remediation, carbon capture and storage efforts, or other greenhouse gas reduction methods. The mitigation factors can be directly subtracted from corresponding environmental impacts (for example acres of reclaimable land can be subtracted from the acres of land disturbance) or can be weighted and subtracted from the independently weighted environmental impacts to arrive at the environmental evaluation.

Considering the environmental value of processing methods specifically, the cracking of large hydrocarbons and the addition of hydrogen to unsaturated hydrocarbon molecules are both associated with greenhouse gas release. Historically, processing technologies have been directed towards maximizing the product value derivable from the recovered hydrocarbons. By weighting and factoring the environmental value into the sustainable value equation, processing methods can instead focus on a combined sustainable value rather than simply maximizing product yield.

An additional environmental value consideration during processing of hydrocarbons is the transport of heavy hydrocarbons to a processing facility. Shipment of hydrocarbons by road or rail is associated with environmental cost and risk. These actual environmental costs (e.g., greenhouse gas emissions) and risks (e.g., mitigation of spills) can be quantified and built into the sustainable value equation in either the economic or environmental value determination. While pipeline transport is associated with a relatively low environmental impact of hydrocarbon transportation methods, pipeline access can be limited based on heavy hydrocarbon content, solids content, and corrosion risk. These impacts and risks can be different for hydrocarbon streams that have been subjected to different processing methods, and accounting for these impacts and risks in the sustainable value equation will allow a more environmentally relevant comparison to be made between various processing methods, including transport of the feedstreams for processing.

Due to the high costs of surface mining projects, the recovery goal of such projects has been to maximize recovery of hydrocarbons (on a volumetric basis) from the mined ore. By contrast, in accordance with the rejection methods described herein, rejection of a hydrocarbon fraction can be accomplished by selectively not processing certain fractions of the mined ore, or by selectively not processing certain of the hydrocarbon fractions that have been recovered (extracted) from mined ore. Such selection can be based on an evaluation and characterization of the reservoir, and a determination of sustainable value associated with options for recovery/processing in advance of any mining activity, or during active mining. Further, real time analysis of the mine face or analysis of mined ore can be used to advise downstream rejection of hydrocarbons.

In addition to rejection of hydrocarbons based on quality or composition, or location of the hydrocarbons, ore can be flagged for rejection during surface mining based on criteria not related to hydrocarbon content. For example, ore that is known to be high in fines content is costly to process as the hydrocarbons become closely associated with clay fines, making recovery difficult. Further, the processing of high fines ores has an environmental impact associated with the inability of the fines to settle once mixed with water. The processing of high fines ores typically results in the necessity for tailings ponds. The sustainable value of recovering and processing hydrocarbons derived from high fines ores is low, and such fractions can therefore be rejected or deprioritized for processing. For example, such ore can be stored for processing during times of high oil prices or once suitable environmental mitigation technologies have been developed to improve the sustainable value of processing the ore.

During surface mining, periodic analysis of the mine face is typically done through visual inspection by a geologist, but can be accomplished using imaging and computer analysis. To the extent that rejection parameters such as fines content, asphaltenes content, bitumen content, etc. can be evaluated by mine face analysis, the rejection of ore can be accomplished prior to or during mining.

In some implementations, mined ore can be allocated to a particular batch, stream, or haul truck based on mine face analysis. When rejected ore must be mined in order to access desirable ore, the rejected ore can be mined and allocated for disposal, fill, or low priority processing. In some implementations, the rejected ore can be sequestered in a disposal pit or used for non-processing purposes, such as in construction of roads, berms, or other structures.

When rejecting hydrocarbons further to surface mining, rejection may be more heavily weighted towards reducing economic costs or increasing economic value of derived products. That is, due to the high costs of surface mining and recovery of hydrocarbons from mined ore, the sustainable value threshold for processing ore can be lower than the threshold for in situ hydrocarbon fractions. In some implementations, the sustainable value threshold for surface mining is selected such that up to 10% or up to 20% of the recoverable or recovered hydrocarbons in the reservoir are selectively rejected during recovery.

During recovery of hydrocarbons from surface-mined ore, there are many opportunities to reject hydrocarbons on an adjustable or flexible basis. For example, ore can be rejected during slurry preparation by electing not to add specific types of ore to the slurry. Further, hydrocarbons can be rejected during froth recovery in a gravity separation step by adjusting the residence time or by varying the number or type of separation stages. As a further example, paraffinic froth treatment can be used to selectively reject asphaltenes during processing. Suitable selection of solvents, additives, or extraction stages can be identified to selectively reject low value hydrocarbon fractions. The rejected fractions can be disposed of or stored for later processing.

In respect of in situ recovery of hydrocarbons from a reservoir, hydrocarbon rejection can be accomplished by leaving one or more low value fractions in the reservoir. For example, selective recovery of higher value fractions using specific recovery techniques or strategic placement of recovery infrastructure (i.e., wells, downhole equipment, fluids, solvents, additives) can allow low value fractions to remain in the reservoir, thereby rejecting the low value fractions.

Various in situ recovery methods have been used to attempt to maximize recovery of hydrocarbons from reservoirs. Despite these efforts, current in situ methods generally leave a material amount of hydrocarbon in the reservoir, and this volume has historically been deemed unrecoverable. Conventionally, in situ recovery operations have not been selected or managed to intentionally reject recoverable hydrocarbons on a selective and proactive basis further to a combined evaluation of economic and environmental considerations.

Thermal recovery methods known in the art can involve steam injection, solvent or heated solvent injection, electromagnetic heating, electric heating, radio frequency heating, in situ combustion, or any combination of the foregoing. Fluid injection to aid hydrocarbon recovery can involve the injection of solvents in liquid or vapor form, non-condensable gases, surfactants, or other additives to mobilize the hydrocarbons.

Further to a reservoir evaluation to characterize low value hydrocarbon fractions, a recovery scheme can be designed on the basis of the highest sustainable value recovery method. The highest sustainable value recovery method may reject significant volumes of selected hydrocarbon fractions.

In another implementation, one or more recovery methods can be combined to arrive at the highest sustainable value recovery method. Still further, one or more recovery methods can be considered together with one or more processing methods to arrive at the highest sustainable value recovery/processing combination.

Further to an in situ recovery process, a hydrocarbon fraction can be rejected prior to processing, or can be rejected during processing. This can be determined by completing an economic and environmental evaluation of various possible downstream processing combinations and proceeding with the highest sustainable value method.

In some implementations, the sustainable value threshold for in situ recovery is selected such that up to 20% or up to 40% of the recoverable hydrocarbons in the reservoir are selectively rejected.

Where a hydrocarbon feedstream has already been recovered from the reservoir or extracted from mined ore, the feedstream is evaluated in accordance with various processing methods to derive various product combinations and volumes.

An evaluation of the feedstream can be undertaken to characterize the feedstream qualitatively or quantitatively, for example by composition, viscosity, processability, range and value of derivable products, etc. Such characterization can result in a representation of the feedstream as a number of processable fractions of the feedstream. Some of these process/product combinations will be associated with high processing costs and reduced environmental value, primarily due to the upgrading or processing that is necessary to derive valuable products from heavier hydrocarbons. For example, hydroprocessing technologies are expensive to operate and can result in relatively high GHG emissions.

The same evaluation process shown in FIG. 6 can generally also be applied to hydrocarbon fractions of a hydrocarbon feedstream. The feedstream is evaluated (Step 101), and one or more processing methods are identified (Step 102) for processing fractions separately or together to derive products from the feedstream.

Figure 9:
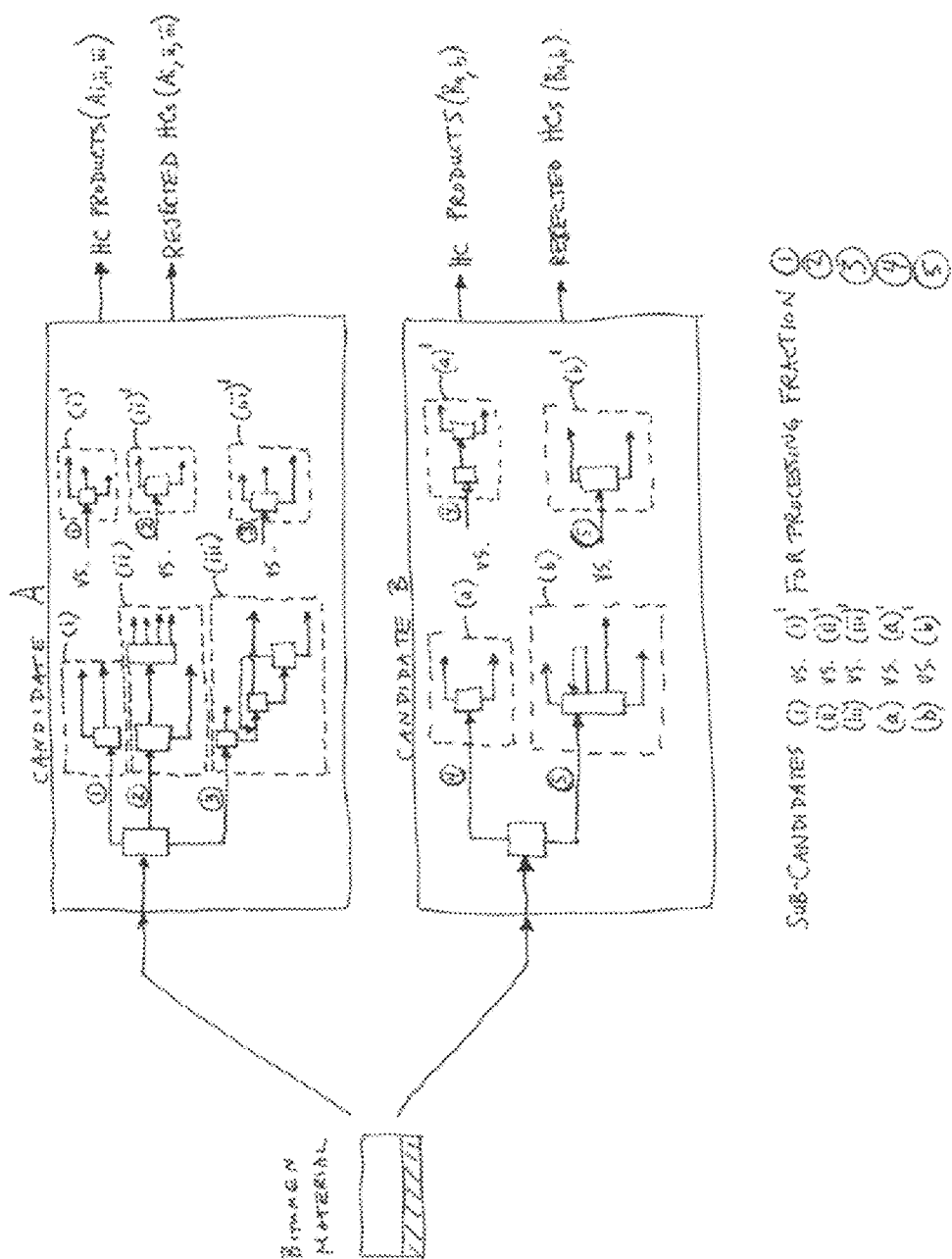
FIG. 9 is a schematic flow diagram.

In this regard, FIG. 9 illustrates that the evaluation of methods for producing hydrocarbon products and rejecting low quality hydrocarbons can include the assessment of overall methods (candidate methods A and B), as well as the assessment of sub-candidate methods (methods (i), (i)', (ii), (ii)', (iii), (iii)', (a), (a)', (b), and (b)') which are potential sub-methods within the larger candidate methods (A or B). For instance, as shown in FIG. 9, the candidate methods A and B could be large-scale methods for receiving oil sands ore as the bitumen-containing starting material and producing upgraded or non-upgraded bitumen streams as the hydrocarbon products. Within each large-scale candidate method A or B, there are several sub-candidate methods that can be evaluated for treating hydrocarbon fractions (fractions 1, 2 or 3 for method A, and fractions 4 or 5 for method B). For each hydrocarbon fraction, candidate processing methods can be evaluated, e.g., methods (i) and (i)' can be evaluated according to methodologies disclosed herein and the more sustainable method can be selected. Such sub-candidate methods can include various different processing technologies.

For example, processing technologies can include, without limitation, relatively higher cost and higher environmental intensity processes, such as hydrocracking or coking, or lower intensity processes such as solvent deasphalting to reject asphaltenes, visbreaking to break large carbon molecules with lower energy intensity, gravity settling, distillation, supercritical solvent separation, saturation of hydrocarbon molecules by reaction with a hydrogen donor that is not hydrogen gas, hydroprocessing at sub-maximal processing intensity, biological conversion of complex hydrocarbons, a non-thermal physical processing step, or a non-thermal chemical processing step.

Various products that can be derived from the feedstream will have different economic values, and processing technologies used to derive the products will also have varying environmental values. Accordingly, if a processable feedstream is divided into a fraction set (set of processable fractions within the feedstream), each fraction set can further be associated with various sets of products derivable from each fraction within the fraction set. Each set of products derivable from a fraction is referred to as product set. Further, each product set can potentially be derived using various sets of technologies (process sets), which can result in different volumes of each product, different economic values, and different environmental values. Therefore, the hydrocarbon feedstream can be evaluated in various possible hydrocarbon fraction sets, and each hydrocarbon fraction set can be evaluated on the basis of various process/product combinations. Economic evaluation (Step 103) and environmental evaluation (Step 104) of each fraction can therefore be determined based on each process/product combination. A determination of sustainable value (Step 105) for each processing method or combination can be used to compare potential methods and to select the highest sustainable value method (Step 107). Once selected, the method is deployed (Step 108), resulting in hydrocarbon fractions of the feedstream being processed (Step 109) or selectively rejected (Step 110). Rejection can include disposal or de-prioritization of an entire fraction of the feedstream (a fraction is separated from the feedstream and will not be processed to derive products, or will be processed with low priority), but can also include rejection of an intermediate stream or a portion thereof that becomes separable from the remainder of the fraction during downstream processing.

Hydrocarbon evaluation and characterization can occur in real time prior to or during processing. Such real time analysis can be used as the primary evaluation method for rejection, can be used to validate a previous decision to reject a hydrocarbon fraction, or can be used to characterize an intermediate processing stream to determine whether the stream should be rejected.

Hydrocarbon streams that are rejected during processing can potentially be sold as product. However, depending on the price of oil, some rejected streams can have a negative market value (to generate into products), which would inhibit sale of the rejected stream. Rejected streams can be stored until market conditions improve, can be stored as low value source feedstock, used as fill, or sequestered to minimize or offset environmental impact.

The rejection of hydrocarbons, can be performed before or during at any process stage, including recovery, secondary extraction, upgrading, transport, or refining.

The selection of processing methods based on a determination of sustainable value will preferentially favor methods that provide higher economic value, lower cost, higher environmental value, and lower recovery and processing intensity. In some implementations, the selected method can provide lower volumetric yield in recovery, or a reduced product quality. Lower intensity methods can include visbreaking, solvent deasphalting, supercritical solvent separation, saturation of hydrocarbon molecules by reaction with a hydrogen donor that is not hydrogen gas, hydroprocessing at sub-maximal processing intensity, biological conversion of complex hydrocarbons, a non-thermal physical processing step, or a non-thermal chemical processing step.

A sustainable value determination can be made for hydrocarbon transportation methods, and options for transport of a feedstream to an upgrader or refinery can be evaluated as a processing method as discussed above. The potential rejection of hydrocarbons prior to step of transport to an upgrader or refinery can be desirable to minimize transport of the heavier portions of the feedstream to reduce transport costs by minimizing or avoiding the need for mixing with diluent. Heavier feeds can be stored or processed on site to avoid transport of heavy fractions. Reducing the need for transport of heavy fractions will increase effective transport capacity, can reduce transport costs, can increase the economic value and environmental value, and can also increase access to a wider range of refineries that will accept the decarbonized feedstream.

Supplying decarbonized hydrocarbon streams to the refinery market can improve the economic efficiency per barrel recovery and transport costs by one or more of the following:

Reducing or eliminating diluent transport: if decarbonization is sufficient to avoid the need for blending of hydrocarbon streams with diluent, this will significantly impact operating costs in securing and transporting diluent;

Reducing transport costs (whether by pipeline, tanker, road, rail) by avoiding shipping of the low value streams entirely, and through minimizing transport of diluent;

Increasing the proportion of bitumen-derived products transported within existing and future pipeline networks;

Increasing access to a broader range refineries for sale of the decarbonized feedstock (i.e., not be limited to refineries having upgrading or heavy coking capacity configuration);

Increasing the price for which the hydrocarbon stream can be sold to a refinery by providing a better quality, more desirable feedstock; and Increasing the price of the heaviest feedstocks based on supply and demand (i.e., by reducing the availability of the heaviest feedstocks, the price of such feedstocks can rise due to demand by the refineries that do have the capacity to handle these heaviest feeds, and intermediate value feedstocks can be combined for transport and sold at a higher price).

Once a feedstream arrives at a refinery, a sustainable value determination can be made to reject fractions of the transported feedstream, whether or not any carbon rejection has been accomplished at prior process steps. A refinery is well-equipped to reject hydrocarbon streams based on composition of various fractions (i.e., by boiling point), and such rejected streams can be stored to await higher crude prices or new processing technology, can be de-prioritized for processing, or can be discarded or used for alternate purposes (waste fill, land reclamation, etc).

Some aspects and embodiments of techniques related to selective rejection of hydrocarbons during the recovery or processing of hydrocarbons from a hydrocarbon-containing volume are described below.

In a first aspect, there is provided a method for selectively rejecting hydrocarbons during recovery of hydrocarbons from oil sands, the method comprising the steps of: characterizing a higher value hydrocarbon fraction and a lower value hydrocarbon fraction from a volume of recoverable hydrocarbons present in a volume of oil sands, and selecting a hydrocarbon recovery method for use in the selective recovery of hydrocarbons from the oil sands, wherein the selected recovery method preferentially recovers the higher value hydrocarbon fraction while substantially rejecting the lower value hydrocarbon fraction; wherein the selected hydrocarbon recovery method is selected from a series of available recovery methods by considering, for each available recovery method, an environmental evaluation and an economic evaluation to determine a sustainable value for the recovery method, and selecting the highest sustainable value recovery method for use in the selective recovery of hydrocarbons from the volume of oil sands.

In an embodiment, the environmental evaluation is determined by quantifying one or more environmental impacts selected from: greenhouse gas emissions, water usage, land disturbance, wildlife impact, and vegetation impact. The method can further involve quantifying one or more environmental impact mitigation methods for consideration together with the environmental impacts, the environmental impact mitigation methods selected from: water recycling, land reclamation, waste remediation, and greenhouse gas reduction methods.

In one embodiment, the economic value is the difference between the market value of products recovered and the costs of recovery.

In an embodiment, the oil sands from which the hydrocarbons are recovered is an oil sands-bearing geological formation, and the recovery method is an in situ hydrocarbon recovery method. The step of recovering the higher value hydrocarbon fraction can be an in situ upgrading step. The step of substantially rejecting the lower value hydrocarbon fraction can involve leaving up to 40% of the recoverable lower sustainable value hydrocarbons in the reservoir. The lower value hydrocarbon fraction can include complex hydrocarbons such as asphaltenes, saturates, aromatics, resins, or other high boiling hydrocarbon residues.

In an embodiment, the oil sands volume from which the hydrocarbons are recovered is mined oil sands, oil sands slurry, or bitumen froth.

In some embodiments, rejection of the lower value hydrocarbon fraction involves disposal, storage, or sale of the lower value hydrocarbon fraction, without first processing or treating the lower value hydrocarbon fraction.

In various embodiments, the higher and lower value hydrocarbon fractions can be characterized by qualitative evaluation or by quantitative analysis. The quantitative analysis can be accomplished, for example, by analysis of core samples, analysis of mined ore samples, analysis of the reservoir, or analysis of an active recovery operation in the same or a comparable reservoir. The higher and lower value hydrocarbon fractions can be characterized based on viscosity or hydrocarbon composition, or based on estimated processing intensity to derive hydrocarbon products from the fraction. The hydrocarbons in the higher value hydrocarbon fraction can be lighter or less complex hydrocarbon molecules than the hydrocarbon molecules of the lower value hydrocarbon fraction.

In some embodiments, rejection of the lower value hydrocarbon fraction reduces the economic cost per barrel of recovering or of processing the hydrocarbons recovered from the reservoir; or reduces the environmental impact per recovered barrel of recovering or processing hydrocarbons recovered from the reservoir.

In a second aspect, a method is provided for selectively rejecting carbon during the processing of a hydrocarbon feedstream, the method comprising the steps of: evaluating the feedstream to characterize at least one higher value hydrocarbon fraction and at least one lower value hydrocarbon fraction; and, selecting a processing method to preferentially derive products from the higher value hydrocarbon fraction while substantially rejecting the lower value hydrocarbon fraction; wherein the processing method is selected from a plurality of potential processing methods to derive products from the feedstream by considering, for each method, an environmental evaluation of the method and an economic evaluation of the method to determine a sustainable value for each method, and selecting the highest sustainable value processing method for use in selectively processing the feedstream to preferentially derive products from at least one of the higher value hydrocarbon fractions while substantially rejecting hydrocarbons from at least one of the lower value hydrocarbon fractions.

In an embodiment, at least one of the plurality of processing methods to derive products from the feedstream is a low intensity processing step.

in an embodiment, the higher value hydrocarbon stream has a greater proportion of saturated or paraffinic hydrocarbons than the lower value hydrocarbon stream. The lower value hydrocarbon stream can include a greater proportion of asphaltenes, complex hydrocarbon molecules, aromatics, resins, or other high boiling hydrocarbon residues than the higher value hydrocarbon stream.

In an embodiment, substantially rejecting hydrocarbons involves de-prioritizing one or more of the lower value hydrocarbon streams for processing, disposal or sale of the lower value hydrocarbon fractions. Rejection can take place without first processing or treating the lower value hydrocarbon fraction.

In an embodiment, the environmental evaluation is determined by considering one or more environmental impact mitigation methods together with one or more environmental impacts, wherein the environmental impacts are selected from: greenhouse gas emissions, water usage, land disturbance, wildlife impact, and vegetation impact; wherein the environmental impact mitigation methods are selected from: water recycling, land reclamation, waste remediation, and greenhouse gas reduction methods.

In an embodiment, the economic value is determined by subtracting the costs of recovery against the market value of derived products.

In various embodiments, the higher and lower value hydrocarbon fractions are characterized by qualitative evaluation and/or using quantitative analysis. The higher and lower value hydrocarbon fractions can, for example, be characterized based on their viscosity or hydrocarbon composition, or based on estimated processing intensity to derive hydrocarbon products from the fraction.

In an embodiment, substantial rejection of the lower value hydrocarbon fraction reduces the economic cost (per unit of product) or reduces the environmental impact (per unit of product) of processing the hydrocarbon feedstream.

In a third aspect, there is provided a method for processing a hydrocarbon feedstream, comprising: characterizing one or more separable fractions within a hydrocarbon feedstream; for each fraction, determining a sustainable value associated with processing the fraction to derive products by: identifying one or more processing methods to derive products from the fraction; for each processing method, considering an environmental evaluation and an economic evaluation to determine a sustainable value associated with processing the fraction using the method; and selecting the highest sustainable value processing method for the fraction; and prioritizing processing of the hydrocarbon fractions based on the determined sustainable value of the selected method for each fraction, wherein prioritizing comprises one or more of: preferentially processing a hydrocarbon fraction for which the determined sustainable value of the selected method meets a high sustainable value threshold; de-prioritizing processing a hydrocarbon fraction for which the determined sustainable value of the selected method does not meet the high sustainable value threshold; or rejecting a hydrocarbon fraction for which the determined sustainable value of the selected method does not meet a minimum sustainable value threshold.

In some embodiments, the fractions for which the determined sustainable value meets the high sustainable value threshold are processed to derive high economic value products, are processed with minimal economic cost, or are processed with minimal environmental impact.

In some embodiments, the fractions for which the determined sustainable value meets the high sustainable value are processed using low intensity processing methods.

In an embodiment, minimal environmental impact involves one or more of: minimal land disturbance, low water use requirements in processing, low energy intensity in processing, low greenhouse gas emissions in processing, or low tailings production. The minimal environmental impact can be achieved by employing environmental impact mitigation techniques, or remediation techniques.

In some embodiments, processing of the rejected fractions to derive products would result in high economic cost, low economic value products, or high environmental impact. For example, processing of the rejected fractions can reduce environmental performance.

In some embodiments, the step of rejecting a hydrocarbon fraction can involve disposal, sale or storage of hydrocarbons. The rejected fraction can, for example, be used as construction material during land reclamation.

In some embodiments, the de-prioritized hydrocarbon fractions have been determined to meet the minimum sustainable value threshold.

In some embodiments, de-prioritizing a hydrocarbon fraction can involve storing hydrocarbons for later processing, blending the intermediate hydrocarbon fractions with other hydrocarbon streams, or processing the intermediate hydrocarbon fractions using low intensity processing methods. Low intensity processing methods can, for example, involve processing methods that have an acceptable economic cost, derive products of acceptable economic value.

In an embodiment, rejected fractions are rejected during processing of hydrocarbons to derive products. For example, rejection can occur during upgrading of bitumen from mined ore. The rejected hydrocarbon fraction can include asphaltenes, complex carbon molecules, aromatics, resins, or other high boiling hydrocarbon residues than the higher value hydrocarbon stream.

In some embodiments, derivable products are hydrocarbon products, non-hydrocarbon byproducts such as sulfur, heavy minerals, water, coke, sulfur, and/or electricity.

In a fourth aspect, a method is provided for recovery or processing of hydrocarbons from a hydrocarbon-containing volume, the method comprising the steps of: characterizing one or more recoverable or processable hydrocarbon fractions within the hydrocarbon-containing volume; identifying one or more methods to recover or process the hydrocarbon fractions to derive one or more products; for each method, determining: an economic value based on an expected market price for products derivable from the fraction and an expected recovery or processing cost to derive the products; an environmental value based on an environmental impact of the recovery method or processing method; and a sustainable value based on the determined economic value, and the determined environmental impact; based on the determined sustainable value of each method, selecting a method for recovery or processing one or more of the hydrocarbon fractions while rejecting at least one of the recoverable or processable hydrocarbon fractions.

In an embodiment, the method to recover or process the hydrocarbon fraction includes one or more of: a mined ore extraction process, an in situ recovery process, a hydrocarbon upgrading process, a hydrocarbon transport process, and a hydrocarbon refining process.

In an embodiment, the steps of determining an economic value, and determining an environmental value can involve determining same for each identified recovery and processing method.

In some embodiments, the fraction that is rejected is up to 20% of the recoverable hydrocarbons, or is up to 40% of the recoverable hydrocarbons. In some embodiments, the fraction that is rejected is recovered but is not processed to derive products. Further, the fraction that is rejected can be partially processed, can be stored for later processing, or can be processed using low intensity methods.

In some embodiments, the sustainable value is determined by weighting the relative importance of the determined economic evaluation and the determined environmental value.

Furthermore, the sustainability assessment or the sustainable value determination can also include a social component in addition to the economic and environmental components. The social evaluation can be performed taking into consideration various items and a social indicator can be generated and incorporated into the overall sustainability assessment.

In addition, a hydrocarbon product or a non-hydrocarbon product produced by a method as described herein, can also be considered as an aspect of the technology described in the present application. Such products can be advantageous with respect to their overall sustainability compared to other products that are produced using other means.

Certain examples are provided below to illustrate certain aspects of the techniques described herein.

EXAMPLE

Processing of a SAGD Produced Bitumen Feedstream

A SAGD produced bitumen stream was evaluated and characterized on the basis of boiling point. as follows:

| | |
|---|---|
| Naphtha (up to 266° C.) | 2.1% |
| Distillate (266-343° C.) | 8.9% |
| Light Gas Oil (343-399° C.) | 10.2% |
| Heavy Gas Oil (399-454° C.) | 9.4% |
| Vacuum Gas Oil (454-527° C.) | 16.1% |
| Vacuum Residue (527° C.) | |
| Saturates | 3.8% |
| Aromatics | 20.0% |
| Resins | 17.8% |
| Asphaltenes | 11.7% |

Based on the above characterization, the vacuum residue components (totaling 53.3% of the feedstream) were identified as the low value hydrocarbon fraction, and the remaining feedstream (boiling point up to 527° C.) was identified as the high value hydrocarbon fraction.

Methods were identified to selectively reject hydrocarbons from the lower value hydrocarbon fraction, while preferentially processing hydrocarbons from the higher value hydrocarbon fraction.

Method 1: Benchmark—Addition of diluent to the SAGD bitumen to dilute the feedstream to a degree necessary to meet pipeline specification. The diluted bitumen stream is transported by pipeline to a refinery and processed using conventional refinery processing methods.

Method 2: Solvent Deasphalting—The SAGD bitumen feedstream is subjected to a solvent deasphalting process to derive a mixture of synthetic crude oils as the higher value fraction, which is transported by pipeline to a refinery for conventional processing. Asphaltenes are produced as a rejected low value fraction.

Method 3: Medium Severity Coking—Higher value fractions are separated from the SAGD bitumen feedstream by atmospheric and vacuum distillation on the basis of boiling temperature. The vacuum residue is treated by medium severity coking (temperature range at approximately 510° C.). The resulting unsaturated hydrocarbons are hydrotreated to derive synthetic crude oils and higher quality distillates as the high value hydrocarbon fraction, which are transported by pipeline to a refinery for conventional hydroprocessing. Coke (primarily composed of high molecular weight hydrocarbons) is produced and rejected as a low value hydrocarbon fraction.

Method 4: Hydrocracking—Higher value fractions are separated from the SAGD bitumen feedstream by atmospheric and vacuum distillation on the basis of boiling temperature. The vacuum residue fraction is treated by hydrocracking, and the hydrocracked products and distillation products are transported to a refinery for conventional hydroprocessing. While this method does not specifically reject low value hydrocarbons, it preferentially converts low value hydrocarbon fractions to higher value hydrocarbon fractions by hydrocracking. This method was selected for evaluation as a low intensity conversion process alternative.

For the sustainable value calculation, Method 1 was used as a benchmark, and each of the other processing methods were compared against the benchmark to arrive at an economic and environmental values for use in calculating a sustainable value for each method.

TABLE 1

Economic Value Calculation

| Parameter compared to Benchmark Method | Diluent addition and transport (Benchmark Method) | Solvent Deasphalting ($/bbl compared to benchmark) | Medium Severity Coking ($/bbl compared to benchmark) | Hydrocracking ($/bbl compared to benchmark) |
|---|---|---|---|---|
| Product Yield (per bbl bitumen) | 100% | 90% | 77% | 103% |
| Product Value | Base Case | 11.64 | 15.10 | 12.73 |
| Product Transport Cost | | (2.07) | (5.16) | 0.63 |
| Diluent Cost | | (7.68) | (8.60) | (7.50) |
| Capital Cost | | 4.84 | 11.42 | 9.40 |
| Co-product handling Cost | | 0.93 | 0.93 | 0 |
| Operating Cost | | 5.17 | 9.77 | 7.31 |
| Sustaining Capital Cost | | 0.56 | 1.33 | 1.09 |
| Taxes | | 3.19 | 2.86 | 1.72 |
| Economic Value compared to benchmark | | 6.7 | 2.6 | 0.1 |

As shown above, each method results in a different product yield and product value. Methods 2 and 3 (solvent deasphalting and medium severity coking) result in a lower product yield and higher product value than the benchmark method, and Method 4 (hydrocracking) results in both a higher product yield and higher product value than the benchmark method. The differences in product yield are accounted for by the input costs. For example, Methods 2 and 3 require greater feedstream volumes to result in the same amount of product as the benchmark method, and Methods 2 and 3 have reduced transport and diluent costs compared to the benchmark. Accordingly, when calculating economic value in this example, the costs/bbl shown in the table can be subtracted directly from the product value/bbl for each method to arrive at the economic value/bbl of each method in comparison to the benchmark.

TABLE 2

Environmental Value Calculation

| Parameter compared to Benchmark Method | Diluent addition and transport (Benchmark Method) | Solvent Deasphalting (kg $CO_2$/bbl bitumen) | Medium Severity Coking (kg $CO_2$/bbl bitumen) | Hydrocracking (kg $CO_2$/bbl bitumen) |
|---|---|---|---|---|
| GHG emissions from method implementation | Base Case | 10.0 | 43.0 | 53.0 |
| GHG emissions from transportation | | (2.0) | (3.0) | (2.0) |
| GHG emissions from refining | | (28.0) | (29.0) | (33.0) |
| GHG emissions compared to benchmark | | (20.0) | 11.0 | 18.0 |
| Environmental Value based on GHG emission reduction | | 20 | (11.0) | (18.0) |

Sustainable Value Calculation

Based on the magnitude of the numbers calculated for each of the economic value and environmental value, weightings for each were selected. A weighting of 100 was used as a multiplier for the economic value, and a weighting of 10 was used with the environmental value, to convert the magnitude of the environmental values to a scale that suitably modifies the economic value. That is, the weighted environmental value is a significant fraction of the weighted economic value. In this example, the weighted values reflect economic value as the primary factor in selecting the method, while the weighted environmental value acts as a significant modifier of the weighted economic value.

TABLE 3

Sustainability Comparison

| | Weight | Solvent Deasphalting | Medium Severity Coking | Hydrocracking |
|---|---|---|---|---|
| Economic Evaluation | 100 | 670 | 260 | 10 |
| Environmental Evaluation | 10 | 200 | (110) | (180) |
| Calculated Sustainable Value | | 870 | 150 | (170) |

Based on the calculated sustainable values from Table 3, solvent deasphalting is selected as the preferred processing method for the SAGD produced bitumen feedstream. The feedstream is therefore processed to selectively reject asphaltenes (low value hydrocarbon fraction), and to derive products from the higher value hydrocarbons within the feedstream (all hydrocarbons in the feedstream except those rejected as asphaltenes).

The determination of sustainable value can be determined or assisted by the computer-aided modelling of a recovery method, processing method, or combination thereof. Software can be used to calculate the economic value and/or environmental value subject to operational and process constraints, and to determine the sustainable value based on a range of weightings for each value in accordance with the methods herein described.

Well-known methods, procedures and components have not been described in detail so as not to obscure the above description of decarbonization methods. The description is not to be considered as limiting the scope of any examples described herein.

The steps or operations in the flow charts and diagrams described herein are just for example. There may be variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A process for producing a hydrocarbon product and selectively rejecting low quality hydrocarbons from a bitumen-containing material, comprising:
   characterizing hydrocarbons present in the bitumen-containing material to identify higher quality hydrocarbon fractions and lower quality hydrocarbon fractions, wherein the higher quality hydrocarbons have at least one property selected from a higher hydrogen-to-carbon ratio, a lower metals content, a lower asphaltene content, a lower boiling point, a lower molecular weight, a lower olefin content, a lower viscosity, a lower density, a lower contaminants content, or a lower sulfur content, compared to lower quality hydrocarbons;

selecting a candidate method from multiple candidate methods for producing a corresponding hydrocarbon product from the bitumen-containing material, wherein the selecting of the candidate method is based on:
   i) product quality of the hydrocarbon product producible by the corresponding candidate method;
   ii) production yield of the hydrocarbon product producible by the corresponding candidate method;
   iii) processing input requirements to generate the hydrocarbon product using the corresponding candidate method, comprising at least one of energy requirements, equipment requirements, materials requirements, maintenance requirements, greenhouse gas emission cost or waste remediation requirements; and
   iv) environmental benefits of using the candidate method, comprising at least one of reduced greenhouse gas emissions, reduced waste production, reduced water use, reduced land disturbance, reduced wildlife impact, or reduced vegetation impact, as compared to a baseline method for recovery of hydrocarbons from the bitumen-containing material;
   wherein each candidate method:
      selectively rejects a particular quantity of low quality hydrocarbons from the bitumen-containing material, the rejected low quality hydrocarbons comprising at least a portion of the lower quality hydrocarbon fraction identified in the bitumen-containing material, or a processed lower quality hydrocarbon fraction formed by processing hydrocarbons identified in the bitumen-containing material in accordance with the candidate method, or a combination thereof;
      selectively produces the corresponding hydrocarbon product free of the rejected hydrocarbons and including at least a portion of the higher quality hydrocarbon fraction identified in the bitumen-containing material, or a processed higher quality hydrocarbon fraction formed by processing hydrocarbons identified in the bitumen-containing material in accordance with the candidate method, or a combination thereof; and
      wherein the selected candidate recovery method has an environmental benefit that is neutral or positive when compared to the baseline method; and
   deploying the selected candidate method to produce the hydrocarbon product and selectively reject the particular quantity of low quality hydrocarbons from the bitumen-containing material.

2. The process of claim 1, wherein the bitumen-containing material is from a subterranean bitumen-bearing reservoir and the candidate methods comprise in situ recovery methods.

3. The process of claim 1, wherein the bitumen-containing material is from a minable oil sands deposit and the candidate methods comprise oil sands mining or extraction methods.

4. The process of claim 1, wherein the bitumen-containing material is a bitumen-containing process stream derived from a subterranean bitumen-bearing reservoir, a minable oil sands deposit, or a combination thereof.

5. The process of claim 4, wherein the bitumen-containing process stream comprises an oil sands ore stream, an aqueous oil sands slurry stream, a non-aqueous oil sands slurry, a bitumen froth stream, a diluted bitumen stream, or a non-upgraded bitumen stream or a combination thereof.

6. The process of claim 1, wherein the selective rejection of the low quality hydrocarbons from the bitumen-containing material comprises diverting the rejected low quality hydrocarbons to storage or disposal.

7. The process of claim 1, wherein the rejected low quality hydrocarbons form part of a rejected stream that further comprises at least one of water, mineral solids, and metals.

8. The process of claim 1, wherein the environmental benefits of each candidate method comprise at least reduced greenhouse gas emission intensity compared to the baseline method.

9. The process of claim 1, wherein the selecting comprises:
   for each candidate method:
      determining a product quality indicator, a production yield indicator, a processing input requirements indicator and an environmental benefits indicator for the candidate method; and
      combining the determined product quality indicator, production yield indicator, and processing input requirements indicator to generate a feasibility indicator; and
   selecting the candidate method based on both the feasibility indicator and the environmental benefits indicator.

10. The process of claim 9, wherein the selecting comprises:
   for each candidate method, aggregating the product quality indicator, the production yield indicator, the processing input requirements indicator and the environmental benefits indicator to generate a single sustainability indicator; and
   selecting the candidate method having the highest sustainability indicator.

11. The process of claim 10, wherein the selective rejection of the particular quantity of the low quality hydrocarbons is a predominant factor that causes the selected candidate method to have a higher feasibility indicator compared to the non-selected candidate methods, a higher environmental benefits indicator compared to the non-selected candidate methods, or a combination thereof.

12. The process of claim 1, wherein the selected candidate method selectively rejects the highest quantity of low quality hydrocarbons of the multiple candidate methods.

13. The process of claim 1, wherein:
   the bitumen-containing material is a non-upgraded bitumen stream;
   the candidate recovery methods comprise at least:
      a solvent deasphalting method wherein the corresponding rejected low quality hydrocarbon fraction comprises an asphaltene-rich fraction and the corresponding hydrocarbon product comprises a substantially deasphalted product; and
      a coking method wherein the corresponding rejected low quality hydrocarbon fraction comprises a coke-rich fraction and the corresponding hydrocarbon product comprises an upgraded product; and
   the solvent deasphalting method has favourable production yield, processing input requirements and environmental benefits compared to the coking method, that offset lower quality of the substantially deasphalted product compared to the upgraded product; and
   the selected candidate method is the solvent deasphalting method.

14. The process of claim 1, wherein:
the bitumen-containing material is a non-upgraded bitumen stream;
the candidate recovery methods comprise at least:
- a solvent deasphalting method wherein the corresponding rejected low quality hydrocarbon fraction comprises an asphaltene-rich fraction and the corresponding hydrocarbon product comprises a substantially deasphalted product; and
- a hydrocracking method wherein the corresponding rejected low quality hydrocarbon fraction comprises a hydrocracking residue fraction and the corresponding hydrocarbon product comprises a hydrotreated product; and the solvent deasphalting method has favourable processing input requirements and environmental benefits compared to the hydrocracking method, that offset lower quality and production yield of the substantially deasphalted product compared to the hydrotreated product; and the selected candidate method is the solvent deasphalting method.

15. The process of claim 1, wherein the candidate methods comprise at least a first candidate method and a second candidate method, the first candidate method having at least favourable processing input requirements and environmental benefits compared to the second candidate method and which offset lower production yield of the hydrocarbon product of the first candidate method compared to the hydrocarbon product of the second candidate method; and the selected candidate method is the first candidate method.

16. The process of claim 1, wherein each candidate method abstains from immediate active processing of the rejected low quality hydrocarbons after separation thereof from remaining hydrocarbons.

17. The process of claim 1, wherein, in the selecting step, the product quality is based on at least one property selected from hydrogen-to-carbon ratio, metals content, asphaltene content, boiling point, molecular weight, olefin content, viscosity, density, contaminants content, or sulfur content.

18. The process of claim 1, wherein the candidate methods are for performing hydrocarbon recovery, hydrocarbon processing, or a combination thereof.

19. The process of claim 1, wherein one or more of the candidate methods produces multiple hydrocarbon products, and the selecting is performed based on the product quality of the multiple hydrocarbon products, the production yield of the multiple hydrocarbon products, the processing input requirements to produce the multiple hydrocarbon products, and the environmental benefits related to production of the multiple hydrocarbon products.

20. The process of claim 1, wherein one or more of the candidate methods produces a non-hydrocarbon product, and the selecting is performed based on quality of the non-hydrocarbon product, yield of the non-hydrocarbon product, input requirements to produce the non-hydrocarbon product, and environmental benefits related thereto.

* * * * *